United States Patent
Ogura et al.

(10) Patent No.: US 11,463,879 B2
(45) Date of Patent: Oct. 4, 2022

(54) COMMUNICATION DEVICE, INFORMATION PROCESSING SYSTEM AND NON-TRANSITORY COMPUTER READABLE STORAGE MEDIUM

(71) Applicants: Kabushiki Kaisha Toshiba, Tokyo (JP); Toshiba Infrastructure Systems & Solutions Corporation, Kawasaki (JP)

(72) Inventors: Naoki Ogura, Yokohama (JP); Fukutomo Nakanishi, Sumida (JP); Jun Kanai, Inagi (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 65 days.

(21) Appl. No.: 17/079,585

(22) Filed: Oct. 26, 2020

(65) Prior Publication Data
US 2021/0297860 A1    Sep. 23, 2021

(30) Foreign Application Priority Data

Mar. 19, 2020   (JP) .............................. JP2020-049858

(51) Int. Cl.
*H04L 21/00*     (2006.01)
*H04W 12/106*    (2021.01)
(Continued)

(52) U.S. Cl.
CPC ....... *H04W 12/106* (2021.01); *H04W 12/037* (2021.01); *H04W 12/0433* (2021.01); *H04W 12/122* (2021.01)

(58) Field of Classification Search
CPC ............... H04L 63/068; H04L 63/1441; H04L 63/1408
See application file for complete search history.

(56) References Cited

U.S. PATENT DOCUMENTS 10,397,260 B2 *  8/2019  Hamada ............. H04L 63/1441
10,476,901 B2 * 11/2019  Hamada ............. H04L 63/0209
(Continued)

FOREIGN PATENT DOCUMENTS

JP              6356871 B2     7/2018

OTHER PUBLICATIONS

Jian et al., "Protecting Receiver-Location Privacy in Wireless Sensor Networks", IEEE INFOCOM 2007—26th IEEE International Conference on Computer Communications, Date of Conference: May 6-12, 2007.*

*Primary Examiner* — Morshed Mehedi
(74) *Attorney, Agent, or Firm* — Oblon, McClelland, Maier & Neustadt, L.L.P.

(57) ABSTRACT

According to one embodiment, a communication device belongs to a communication network including a control device and a plurality of communication devices connected to the control device, and transmits a communication packet to a transmission destination communication device. The communication device and the transmission destination communication device are differently one of the plurality of communication devices. In the communication device, a memory stores first information for judging a normality of the communication packet. An analyzing unit judges the normality of a received communication packet based on the received communication packet and the first information. A transmission destination determining unit determines the transmission destination communication device and the control device as transmission destinations of the received communication packet when the analyzing unit judges that the received communication packet is not normal. A generating unit encrypts the communication packet to be transmitted to the transmission destinations.

17 Claims, 18 Drawing Sheets

(51) Int. Cl.
*H04W 12/037* (2021.01)
*H04W 12/122* (2021.01)
*H04W 12/0433* (2021.01)

(56) References Cited

U.S. PATENT DOCUMENTS

2019/0028479 A1* 1/2019 Mori .................... H04L 63/0281
2020/0036682 A1* 1/2020 Honma ............... H04L 61/2517
2020/0228496 A1* 7/2020 Mori .................... H04L 63/0236
2021/0092094 A1* 3/2021 Kim ........................ H04L 63/08

* cited by examiner

COMMUNICATION DEVICE, INFORMATION PROCESSING SYSTEM AND NON-TRANSITORY COMPUTER READABLE STORAGE MEDIUM

CROSS-REFERENCE TO RELATED APPLICATION

This application is based upon and claims the benefit of priority from Japanese Patent Application No. 2020-049858, filed on Mar. 19, 2020; the entire contents of which are incorporated herein by reference.

FIELD

Embodiments of the present invention relate to a communication device, an information processing system and a non-transitory computer readable storage medium.

BACKGROUND

An event has occurred where a system of a factory or a power plant is stopped by being exposed to a developing cyber attack, and the factory or the power plant suffers heavy damage. To minimize damage by the cyber attack, it is becoming more important to introduce a communication monitoring system for detecting unauthorized communication flowing on a system.

To monitor communication, it is necessary to provide a communication device for capturing communication on a communication path. In a huge system, a large number of communication devices would be provided. In such a case, it is often a case that performance of individual communication devices is not high, which is not appropriate for analysis of communication.

There is a possible configuration where, instead of individual communication devices performing detection of unauthorized communication, the individual communication devices transfer captured communication to an external device, and the external device performs analysis.

Meanwhile, unnecessary information leakage is prevented by communication (flowing on a system) being protected by encryption. In a case where communication content is encrypted, the external device needs to perform analysis after performing decryption processing on communication in coordination with a communication device which is a transmission source. Further, after the decrypted communication is analyzed, the communication device which is the transmission source or the external device needs to provide a re-encrypted communication function for performing communication with a communication device which is an original transmission destination. Therefore, in related art, communication delay has occurred due to a plurality of times of encryption/decryption processing.

DETAILED DESCRIPTION

According to one embodiment, a communication device belongs to a communication network including a control device and a plurality of communication devices connected to the control device, and transmits a communication packet to a transmission destination communication device. The communication device and the transmission destination communication device are differently one of the plurality of communication devices. The communication device includes a memory and a processing circuitry. The memory stores first information for judging a normality of the communication packet. The processing circuitry operates as an analyzing unit, a transmission destination determining unit and a generating unit. The analyzing unit judges the normality of a received communication packet based on the received communication packet and the first information. The transmission destination determining unit determines the transmission destination communication device and the control device as transmission destinations of the received communication packet when the analyzing unit judges that the received communication packet is not normal. The generating unit encrypts the communication packet to be transmitted to the transmission destinations determined by the transmission destination determining unit.

First Embodiment

Explanation of Outline of the First Embodiment

Figure 1:
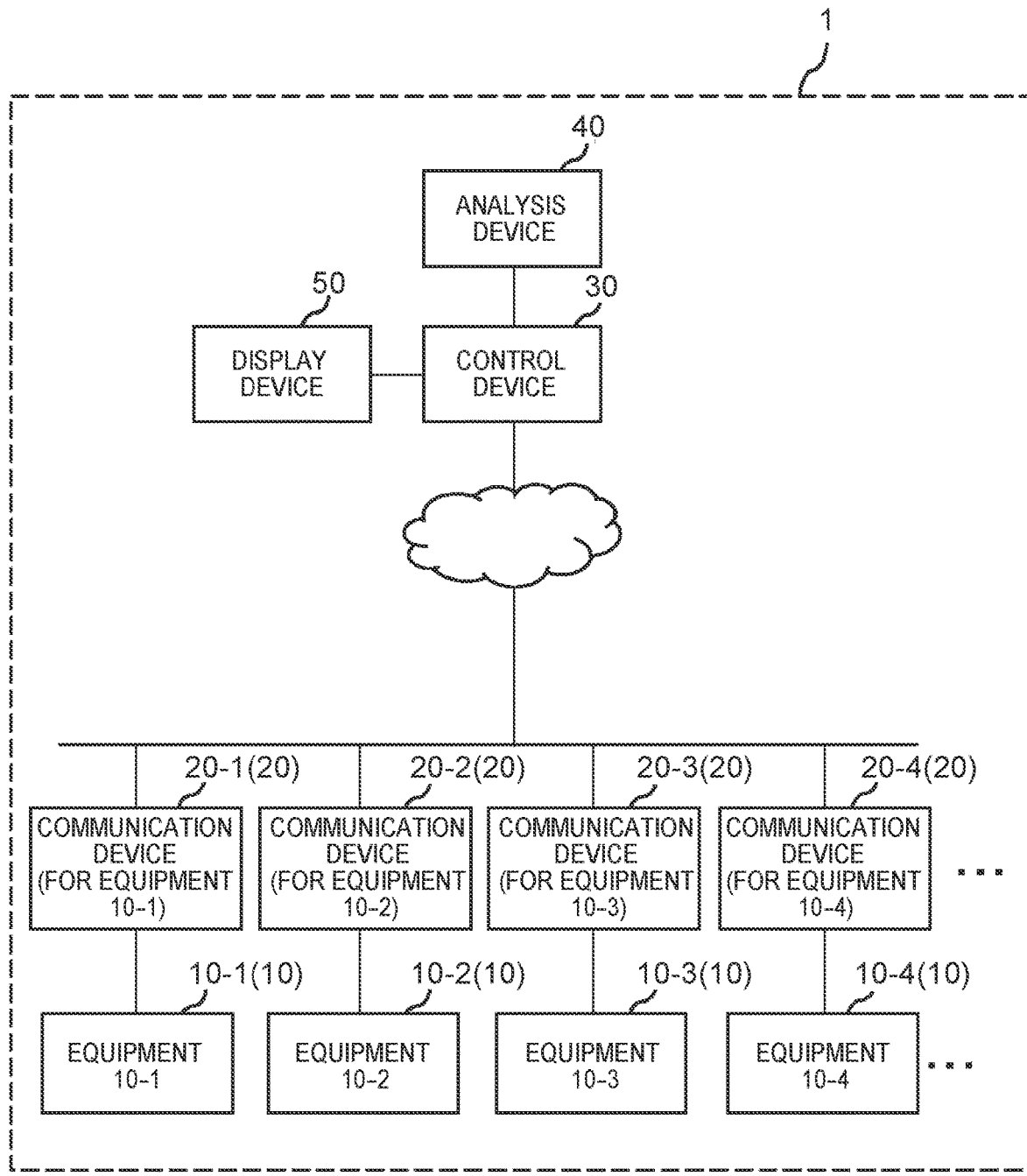
FIG. 1 is a schematic diagram of an information processing system according to a first embodiment.

FIG. 1 is a schematic diagram showing an example of a configuration of an information processing system 1 of the first embodiment. As shown in FIG. 1, the information processing system 1 includes a plurality of communication devices 20 (communication devices 20-1, 20-2, 20-3, and 20-4), a control device 30, an analysis device 40, and a display device 50. To the respective communication devices 20, corresponding equipment 10 (equipment 10-1, 10-2, 10-3, and 10-4) are connected.

In the present embodiment, the equipment 10 and the communication device 20, the communication device 20 and the communication device 20, the communication device 20 and the control device 30, the control device 30 and the analysis device 40, and the control device 30 and the display device 50 are respectively connected to each other via a wired line or a wireless line so as to be able to exchange data and signals with each other.

Note that they may be connected to each other by way of communication equipment such as a repeater, a switching hub and a router on respective lines. Further, in the present embodiment, while the control device 30 and the analysis device 40 are set as different devices, the control device 30 and the analysis device 40 may be implemented on the same hardware. The control device 30 and the display device 50 may be also implemented on the same hardware.

In the information processing system 1, encrypted communication from the equipment 10 to the equipment 10 will be considered. Here, the equipment 10 which is a transmission source will be referred to as equipment 10 (transmission source), and the equipment 10 which is a transmission destination will be referred to as equipment 10 (transmission destination). Further, the communication device 20 connected to the equipment 10 (transmission source) will be referred to as a communication device 20 (transmission source), and the communication device 20 connected to the equipment 10 (transmission destination) will be referred to as a communication device 20 (transmission destination).

In communication from the equipment 10 (transmission source) to the equipment 10 (transmission destination) of the information processing system 1, the communication device 20 (transmission source) performs simplified analysis on a communication packet received from the equipment 10 (transmission source). If it is judged that further analysis is required, the communication device 20 (transmission source) encrypts the communication packet and transmits the communication packet to the communication device 20 (transmission destination) and the control device 30.

The control device 30 decrypts the encrypted communication packet, and transmits the communication packet to the analysis device 40. The analysis device 40 precisely analyzes the communication packet and judges whether or not unauthorized communication occurs. The analysis device 40 transmits the analysis result to the control device 30. The control device 30 notifies an operator who operates the information processing system 1 of the analysis result by causing the received analysis result to be displayed at the display device 50.

As described above, in the information processing system 1, in a case where the communication device 20 (transmission source) judges that further analysis of the communication packet is required, the communication packet is transmitted to the communication device 20 (transmission destination) which is an original transmission destination, and the control device 30 connected to the analysis device 40.

Therefore, in the information processing system 1, it is possible to precisely analyze a communication packet for which precise analysis is required while realizing encrypted communication for the communication device 20 (transmission destination) which is the original transmission destination.

Therefore, because it is only necessary to execute encryption/decryption processing once in communication from the equipment 10 (transmission source) to the equipment 10 (transmission destination) while performing precise analysis on the communication packet, it is possible to reduce communication delay compared to an information processing system in related art which requires a plurality of times of encryption/decryption processing.

Further, in a case where the analysis device 40 judges that communication from the equipment 10 (transmission source) to the equipment 10 (transmission destination) is unauthorized communication, as an example, the operator can interrupt the unauthorized communication by operating a control server of equipment 10 which is not shown.

Here, the equipment 10 is hardware and software which realize functions of each system of a factory, a power plant, or the like. The equipment 10 corresponds to, for example, a personal computer (PC), a work station, a printer, an application server, a data server, a control server, a data historian, a human machine interface (HMI), a supervisory control and data acquisition (SCADA), an engineering workstation (EWS), a programmable logic controller (PLC), an intelligent electronic device (IED), a remote terminal unit (RTU), or the like.

Note that, while there exist four pieces of equipment 10 in FIG. 1, it is sufficient if there exist two pieces of equipment 10. This similarly applies to the communication device 20 to be connected to the equipment 10. Further, while there exists one control device 30 in FIG. 1, there may exist two or more control devices 30. Further, while there exists one analysis device 40, there may exist two or more analysis devices 40.

Further, the communication devices 20 included in the information processing system 1 may exist on the same network. Furthermore, a communication path may be secured so that two pieces of equipment 10 which require to communicate can perform communication.

As an example, it is also possible to employ a configuration where a communication path between the communication device 20-1 (20) and the communication device 20-4 (20) is secured, and a communication path between the communication device 20-2 (20) and the communication device 20-3 (20) is secured separately from the above communication path, and communication paths to the control device 30 are separately secured on the above two communication paths.

Figure 2:
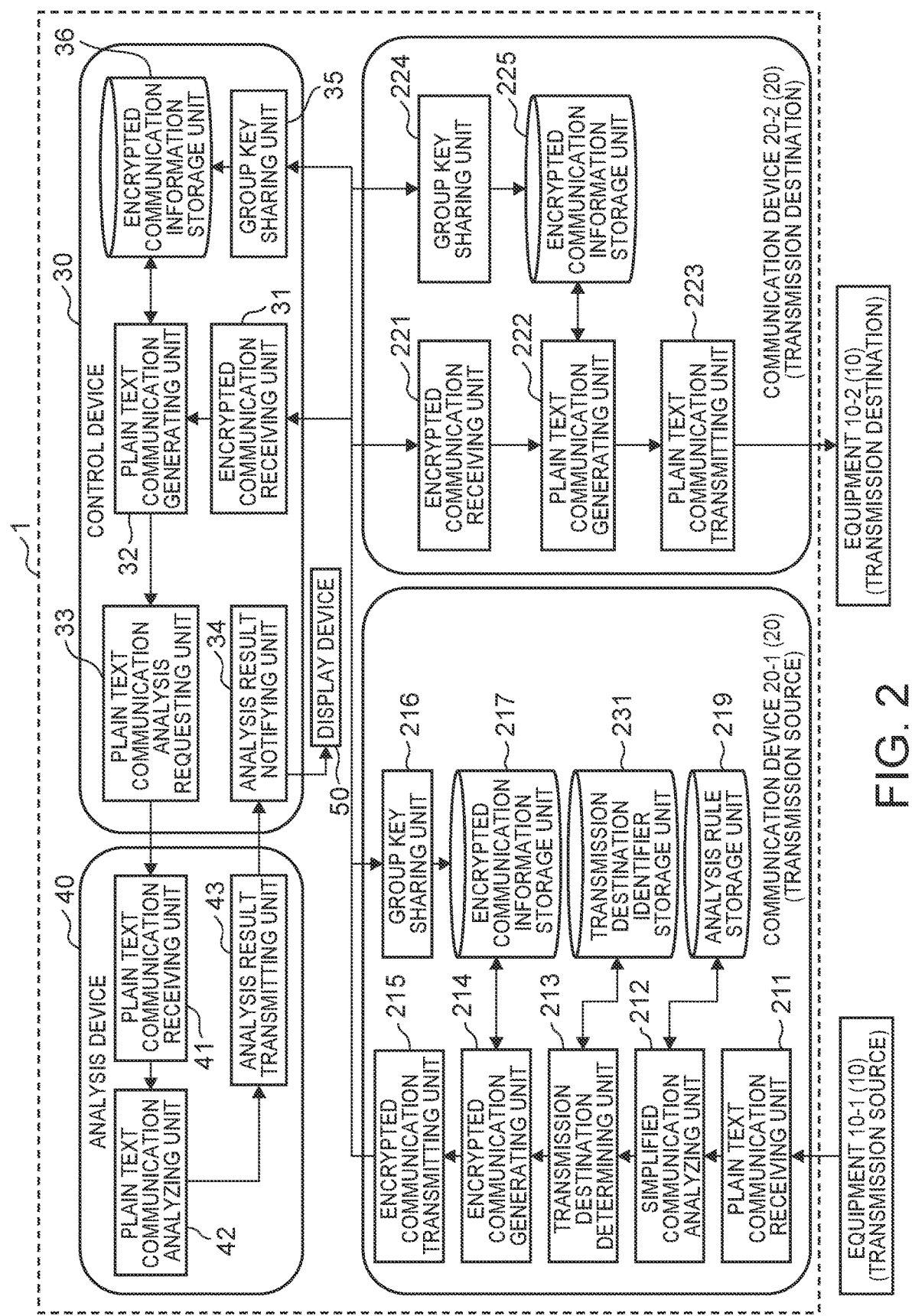
FIG. 2 is a functional block diagram of the information processing system according to the first embodiment.

Next, a functional configuration of the information processing system 1 will be described. FIG. 2 is a functional block diagram showing an example of functional configurations of respective devices which constitute the information processing system 1. Outline of functional parts of the respective devices which constitute the information processing system 1 will be described below with reference to FIG. 2.

In the following description, for the purpose of explanation, a case will be considered where the equipment 10-1 (10) is the transmission source, and the equipment 10-2 (10) is the transmission destination. In this case, the communication device 20-1 (20) becomes the transmission source, and the communication device 20-2 (20) becomes the transmission destination.

First, the communication device 20 will be described. The communication device 20 is hardware and software which control communication transmitted from the equipment 10, and communication received via other communication devices 20.

The communication device 20 has a function of performing encrypted communication with other communication devices 20. Further, the communication device 20 has a function of capturing a communication packet transmitted from the equipment 10 and transmitting a part or all of the captured communication packet to the control device 30 using encrypted communication.

Because each communication device 20 performs both transmission processing and reception processing, each communication device 20 has both a function as the transmission source and a function as the transmission destination. This similarly applies to the communication device 20-1, the communication device 20-2, or the like. To emphasize the functions as communication processing, FIG. 2 distinctively shows functions such that only the function as the transmission source is provided at the communication device 20-1, and only the function as the transmission destination is provided at the communication device 20-2. This similarly applies to the equipment 10.

As shown in FIG. 2, the communication device 20-1 (transmission source) includes a plain text communication receiving unit 211, a simplified communication analyzing unit 212, a transmission destination determining unit 213, an encrypted communication generating unit 214, an encrypted communication transmitting unit 215, a group key sharing unit 216, an encrypted communication information storage unit 217, an analysis rule storage unit 219 and a transmission destination identifier storage unit 231.

The plain text communication receiving unit 211 receives a communication packet from the equipment 10 (transmission source) and outputs the communication packet to the simplified communication analyzing unit 212.

The simplified communication analyzing unit (which will be also referred to as an analyzing unit) 212 performs simplified communication analysis on the communication packet using analysis rule information stored in the analysis rule storage unit 219, and judges whether or not further precise analysis is required.

In the analysis rule storage unit 219 of the first embodiment, white list information is stored as the analysis rule.

The white list information is information for judging normality of a communication packet, which is set in advance by the operator. The white list information is, for example, a list of values (set in advance) for allowing communication for each set of a transmission source IP address, a transmission source port number, a transmission destination IP address, a transmission destination port number (or a type of communication protocol), or the like.

The analysis rule storage unit 219 is realized with, for example, a hard disk drive (HDD).

The simplified communication analyzing unit 212 can acquire the analysis rule from the analysis rule storage unit 219. In a case where information included in the communication packet matches one piece of the white list information, the simplified communication analyzing unit 212 judges that the communication packet is normal and further analysis is not required. The simplified communication analyzing unit 212 outputs the communication packet and the judgment result to the transmission destination determining unit 213.

The transmission destination determining unit 213 determines the transmission destination of the communication packet (the communication device 20-2, or the communication device 20-2 and the control device 30) on the basis of the judgment result of the simplified communication analyzing unit 212. The transmission destination determining unit 213 acquires an identifier (transmission destination identifier) corresponding to the determined transmission destination from transmission destination identifiers stored in the transmission destination identifier storage unit 231, and outputs the communication packet and the transmission destination identifier to the encrypted communication generating unit 214.

The transmission destination identifier storage unit 231 stores the transmission destination identifier to be used by the transmission destination determining unit 213. The transmission destination identifier storage unit 231 is realized with, for example, an HDD, or the like. Note that, while there is a case where a broadcast address or a multicast address is used as the transmission destination of the communication packet, the transmission destination identifier storage unit 231 supports communication (multicasting) in which a plurality of partners is set as the transmission destinations, and manages identifiers indicating transmission destinations (aggregate) which may be designated.

The encrypted communication generating unit (which will be also referred to as a generating unit) 214 encrypts the communication packet using an encryption key (group key) stored in the encrypted communication information storage unit 217. As the group key to be used, a group key corresponding to the transmission destination identifier is used.

The encrypted communication transmitting unit (which will be also referred to as a transmitting unit) 215 provides a communication header to the encrypted communication packet and transmits the communication packet to the transmission destination corresponding to the transmission destination identifier.

The group key sharing unit 216 shares information necessary for encrypted communication with the control device 30 and the communication device 20-2 (transmission destination), and stores the information in the encrypted communication information storage unit 217.

As an example, the communication device 20-1 (transmission source) holds a unique key (device key). The control device 30 generates data which becomes a generation source of the group key in advance, obtains a communication packet by encrypting the data with the device key, and transmits the communication packet to the communication device 20-1 (transmission source). The communication device 20-1 (transmission source) receives the communication packet, and acquires information necessary for encrypted communication.

As a scheme for sharing the group key by the group key sharing unit 216, as an example, a group operation command of IEEE802.21 (https://standards.ieee.org/standard/802_21-2017.html) may be used. In IEEE802.21, a communication amount necessary for sharing the group key is reduced using a complete subtree.

The encrypted communication information storage unit 217 stores information necessary for encrypted communication. For example, the information (necessary for encrypted communication) stored in the encrypted communication information storage unit 217 can include a group key, a transmission destination identifier, a transmission destination multicast address, or the like. The encrypted communication information storage unit 217 is, for example, realized with an HDD, or the like.

Note that, while the encrypted communication information storage unit 217, the analysis rule storage unit 219 and the transmission destination identifier storage unit 231 are described as different storage units, they may be collectively constituted as one storage unit.

Next, outline of respective functional parts of the communication device 20-2 (transmission destination) will be described.

The communication device 20-2 (transmission destination) includes an encrypted communication receiving unit 221, a plain text communication generating unit 222, a plain text communication transmitting unit 223, a group key sharing unit 224, and an encrypted communication information storage unit 225.

The encrypted communication receiving unit 221 receives the encrypted communication packet transmitted from the communication device 20-1 (transmission source), and outputs the communication packet to the plain text communication generating unit 222.

The plain text communication generating unit 222 decrypts the encrypted communication packet, generates the communication packet in a state of a plain text, and outputs the communication packet to the plain text communication transmitting unit 223.

The plain text communication transmitting unit 223 transmits the communication packet to the equipment 10 (transmission destination).

The group key sharing unit 224 shares information necessary for encrypted communication with the control device 30 and the communication device 20-1 (transmission source), and stores the information in the encrypted communication information storage unit 225.

The encrypted communication information storage unit 225 stores information necessary for encrypted communication. For example, the information (necessary for encrypted communication) stored in the encrypted communication information storage unit 225 can include a group key, a transmission destination identifier, a transmission destination multicast address, or the like. The encrypted communication information storage unit 225 is, for example, realized with an HDD, or the like.

Next, outline of respective functional parts of the control device 30 will be described.

The control device 30 decrypts the encrypted communication packet transferred from the communication device 20, and transfers the decrypted communication packet to the analysis device 40.

The control device 30 includes an encrypted communication receiving unit 31, a plain text communication generating unit 32, a plain text communication analysis requesting unit 33, an analysis result notifying unit 34, a group key sharing unit 35, and an encrypted communication information storage unit 36.

The encrypted communication receiving unit 31 receives the encrypted communication packet transmitted from the encrypted communication transmitting unit 215 (of the communication device 20-1 (transmission source)), and outputs the communication packet to the plain text communication generating unit 32.

The plain text communication generating unit 32 decrypts the encrypted communication packet, generates the communication packet in a state of a plain text, and outputs the communication packet to the plain text communication analysis requesting unit 33.

The plain text communication analysis requesting unit 33 transmits the communication packet to the plain text communication receiving unit 41 of the analysis device 40.

The analysis result notifying unit 34 receives the analysis result of the communication packet from the analysis device 40. Further, the analysis result notifying unit 34 outputs the analysis result to a display device 50.

Here, the display device 50 will be described.

The display device 50 notifies the operator (who operates the information processing system 1) of the analysis result by displaying the analysis result of the communication packet.

The group key sharing unit 35 shares information necessary for encrypted communication with the communication device 20-1 (transmission source) and the communication device 20-2 (transmission destination), and stores the information in the encrypted communication information storage unit 36.

The encrypted communication information storage unit 36 stores information necessary for encrypted communication. For example, the information necessary for encrypted communication can include a group key, a transmission destination identifier, a transmission destination multicast address, or the like. The encrypted communication information storage unit 36 is, for example, realized with an HDD, or the like.

Next, outline of respective functional parts of the analysis device 40 will be described. The analysis device 40 receives the decrypted communication packet from the control device 30 and judges whether or not unauthorized communication occurs by further analyzing the communication packet.

Here, unauthorized communication is, for example, communication (port scan) which inspects an open state of a port of the equipment 10, communication which tries connection with another equipment 10 or an external malicious site using unauthorized software (malware), communication at abnormally high frequency, or the like.

The analysis device 40 includes a plain text communication receiving unit 41, a plain text communication analyzing unit 42, and an analysis result transmitting unit 43.

The plain text communication receiving unit 41 receives the communication packet in a state of a plain text from the plain text communication analysis requesting unit 33 of the control device 30.

The plain text communication analyzing unit 42 analyzes the communication packet in a state of a plain text, judges whether or not unauthorized communication occurs, and outputs the analysis result to the analysis result transmitting unit 43.

The analysis result transmitting unit 43 transmits the analysis result to the analysis result notifying unit 34 of the control device 30.

Explanation of Processing Procedure of Information Processing System According to the First Embodiment Next, processing procedure of respective devices of the information processing system 1 according to the present embodiment will be described. Description will be provided in order of the communication device 20-1 (transmission source), the communication device 20-2 (transmission destination), the control device 30, and the analysis device 40.

Figure 3:
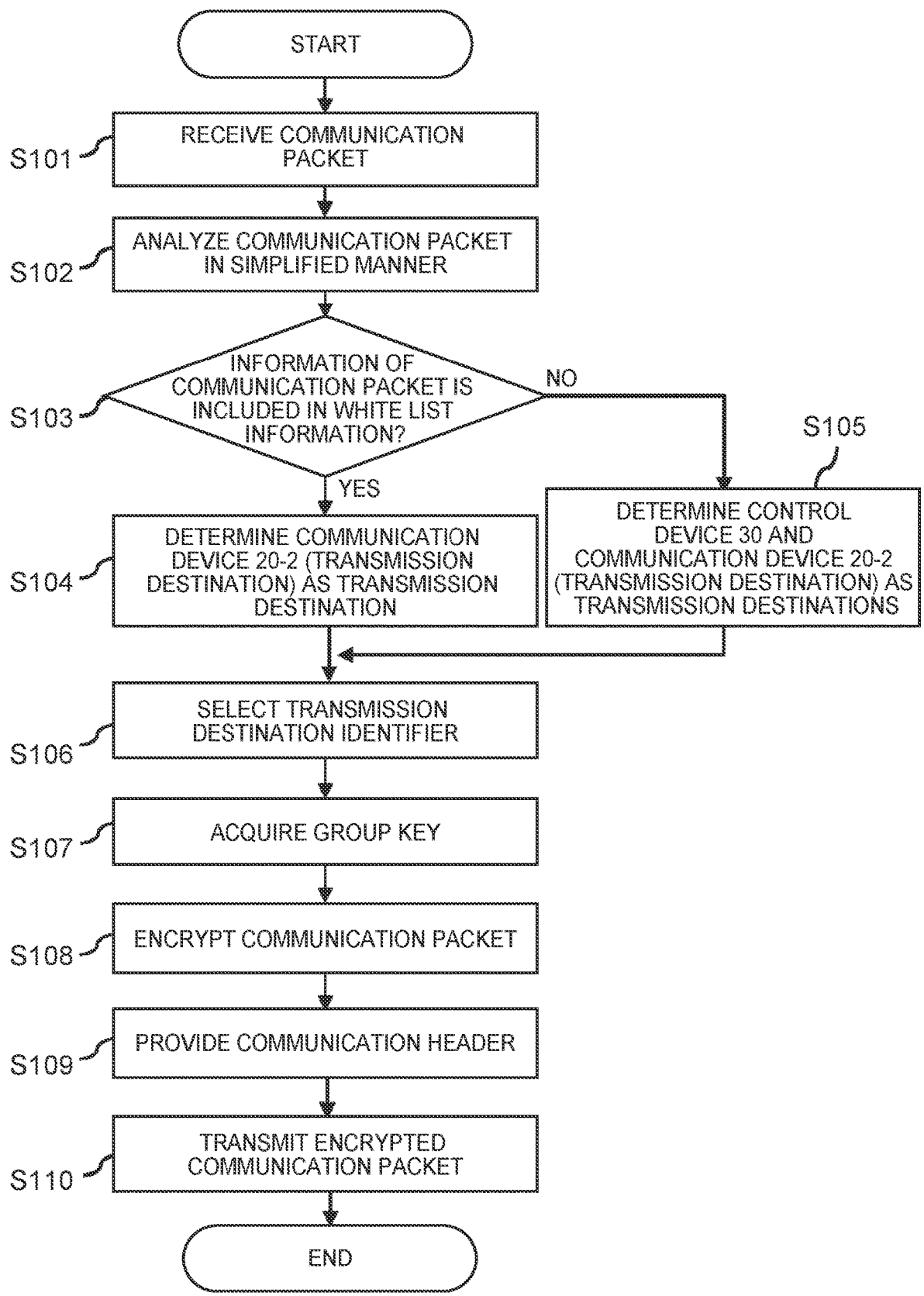
FIG. 3 is a flowchart showing processing procedure of a communication device (transmission source) according to the first embodiment.

FIG. 3 is a flowchart showing an example of processing procedure of the communication device 20-1 (transmission source).

First, the plain text communication receiving unit 211 receives a communication packet from the equipment 10 (transmission source) and outputs the communication packet to the simplified communication analyzing unit 212 (step S101). The communication packet received by the plain text communication receiving unit 211 includes transmission source communication information such as a transmission source IP address and a transmission source port number, transmission destination communication information such as a transmission destination IP address and a transmission destination port number, a payload which is a body of the communication data, or the like.

The simplified communication analyzing unit 212 analyzes the communication packet after acquiring the analysis rule information stored in the analysis rule storage unit 219 (step S102).

In the first embodiment, the analysis rule information is white list information. The simplified communication analyzing unit 212 judges whether or not information of the communication packet is included in the white list (step S103).

As an example, in a case where the transmission destination IP address of the communication packet is not included in the white list information acquired from the analysis rule storage unit 219, the simplified communication analyzing unit 212 judges that the communication packet is not included in the white list information.

In a case where the simplified communication analyzing unit 212 judges that the communication packet is included in the white list (step S103: Yes), the simplified communication analyzing unit 212 outputs the communication packet and the judgment result indicating that "the communication packet is included in the white list (further analysis is not required)" to the transmission destination determining unit 213. Further, the transmission destination determining unit 213 determines the communication device 20-2 (original transmission destination) as the transmission destination (step S104).

In a case where it is judged that the communication packet is not included in the white list (step S103: No), the simplified communication analyzing unit 212 outputs the communication packet and the judgment result indicating that "the communication packet is not included in the white list (further analysis is required)" to the transmission destination determining unit 213. Further, the transmission destination determining unit 213 determines the control device 30 and the communication device 20-2 (original transmission destination) as the transmission destinations (step S105).

The transmission destination determining unit 213 acquires an identifier (transmission destination identifier) corresponding to the determined transmission destination from the transmission destination identifier storage unit 231, and outputs the acquired transmission destination identifier and the communication packet to the encrypted communication generating unit 214 (step S106).

The encrypted communication generating unit 214 acquires an encryption key (group key) managed by the encrypted communication information storage unit 217 (step S107).

The encrypted communication generating unit 214 encrypts the communication packet using the acquired group key (step S108). As the group key to be used by the encrypted communication generating unit 214, a group key corresponding to the transmission destination identifier is used.

As an example, in a case where the transmission destination identifiers indicate the control device 30 and the communication device 20-2 (transmission destination), the encrypted communication generating unit 214 uses a group key shared by the communication device 20-1 (transmission source), the control device 30, and the communication device 20-2 (transmission destination).

As a scheme of encrypting a communication packet using a group key by the encrypted communication generating unit 214, as an example, a communication packet protection scheme of IEEE802.21 (https://standards.ieee.org/standard/802_21-2017.html) may be used. In IEEE802.21, provision of a communication header including the transmission source identifier and the transmission destination identifier, encryption using an AES-CCM scheme, provision of digital signature using an ECDSA-256 scheme, prevention of a replay attack by provision of a sequence number, or the like, are standardized.

Note that a communication header including the transmission source identifier and the transmission destination identifier may be provided to the encrypted communication packet. In a case where the communication packet protection scheme of IEEE802.21 is used, by applying an authenticated encryption scheme using the AES-CCM scheme, the communication packet is also protected against falsification of the provided communication header.

The encrypted communication transmitting unit 215 provides the communication header to the encrypted communication packet (step S109). As an example, the encrypted communication transmitting unit 215 selects a transmission destination multicast address corresponding to the transmission destination identifier. Note that the multicast address is stored in a storage device such as an HDD.

The encrypted communication transmitting unit 215 transmits the communication packet to the transmission destination corresponding to the transmission destination identifier (step S110). As an example, the encrypted communication transmitting unit 215 transmits the encrypted communication packet to which the header (including the transmission destination multicast address) is provided, on the communication path. Then, the communication device 20-1 (transmission source) finishes the processing.

Figure 4:
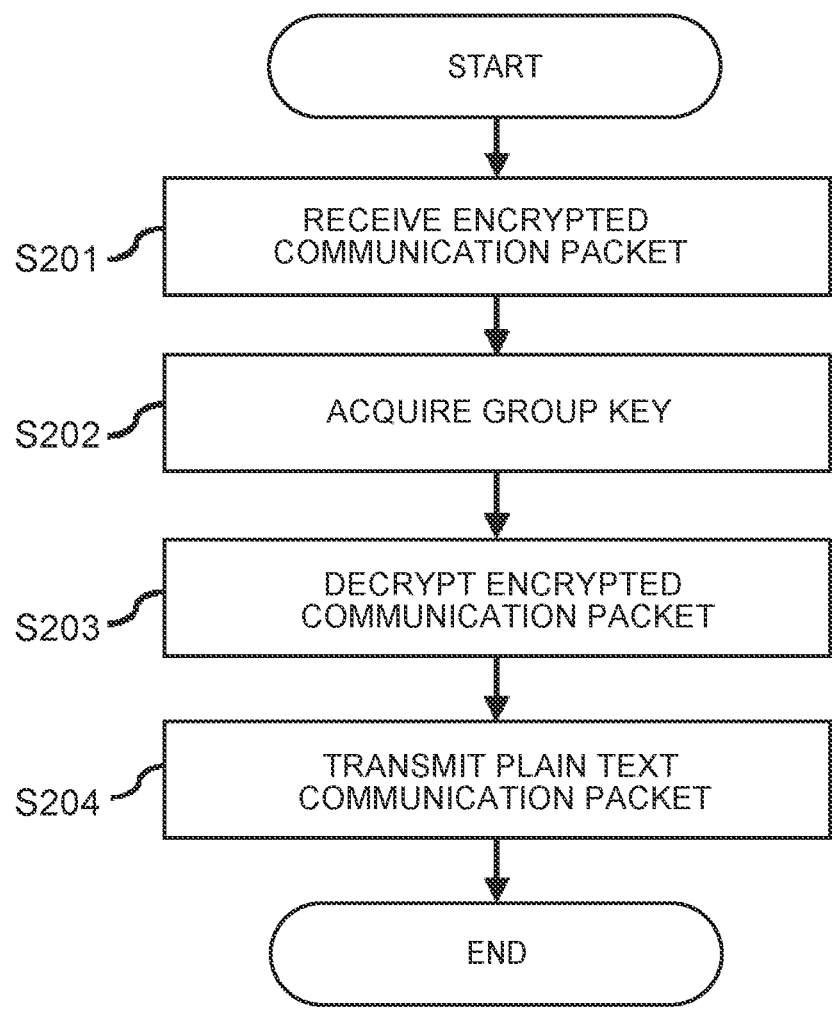
FIG. 4 is a flowchart showing processing procedure of a communication device (transmission destination) according to the first embodiment.

Next, processing of the communication device 20-2 (transmission destination) will be described. FIG. 4 is a flowchart showing an example of processing procedure of the communication device 20-2 (transmission destination).

The encrypted communication receiving unit 221 receives the encrypted communication packet transmitted from the communication device 20-1 (transmission source) and outputs the communication packet to the plain text communication generating unit 222 (step S201).

The plain text communication generating unit 222 acquires the encryption key (group key) managed by the encrypted communication information storage unit 225 (step S202). Note that, in the present embodiment, because encrypted communication is performed using a common key encryption scheme, the encryption key is also a decryption key. As one example, the plain text communication generating unit 222 acquires the group key stored in the encrypted communication information storage unit 225 on the basis of the transmission destination identifier provided to the encrypted communication packet.

The plain text communication generating unit 222 generates a communication packet in a state of a plain text by decrypting the encrypted communication packet using the acquired group key, and outputs the communication packet to the plain text communication transmitting unit 223 (step S203).

Note that, in a case where the plain text communication generating unit 222 fails in the decryption processing in step S203, because there is a possibility that the communication packet is encrypted using an incorrect key, as an example, the plain text communication generating unit 222 may discard the encrypted communication packet.

The plain text communication transmitting unit 223 transmits the communication packet to the equipment 10-2 (transmission destination) (step S204). Then, the communication device 20-2 (transmission destination) finishes the processing.

Figure 5:
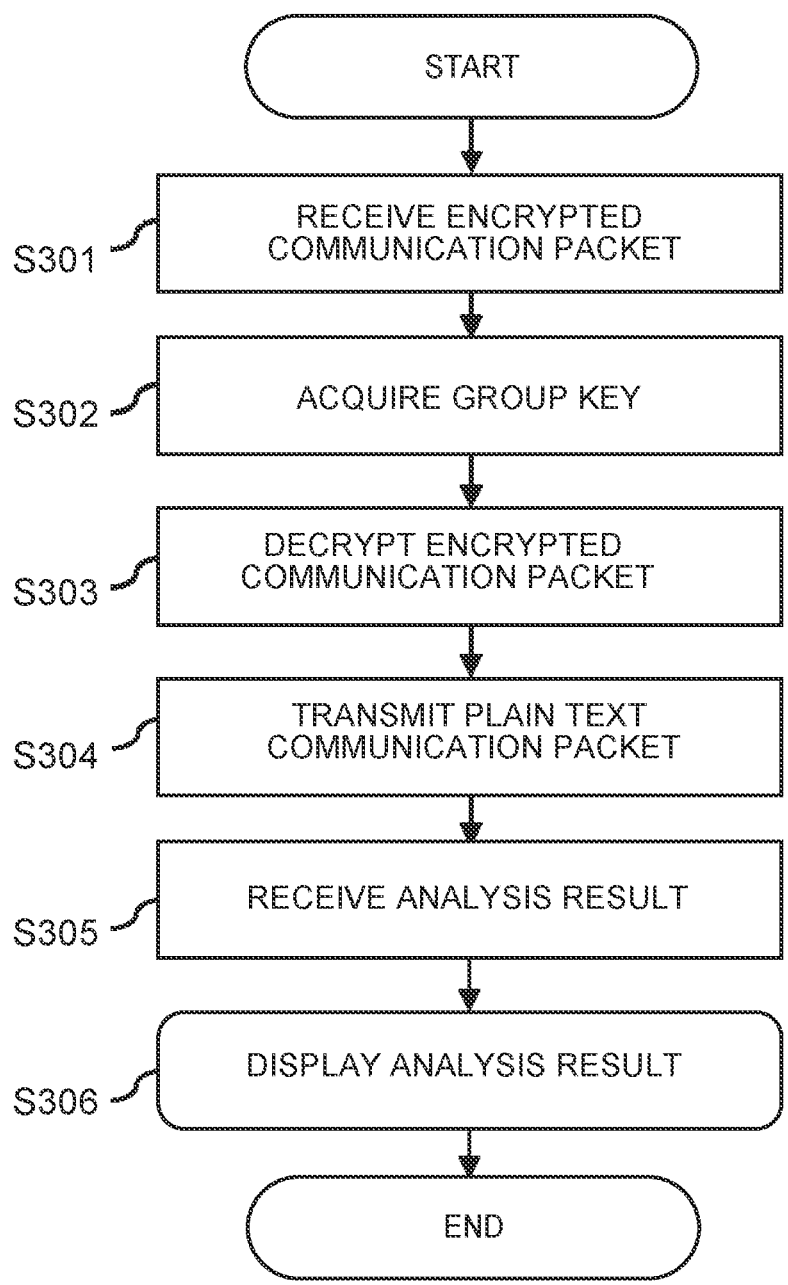
FIG. 5 is a flowchart showing processing procedure of a control device according to the first embodiment.

Next, processing of the control device 30 will be described. FIG. 5 is a flowchart showing an example of processing procedure of the control device 30.

The encrypted communication receiving unit 31 receives the encrypted communication packet transmitted from the encrypted communication transmitting unit 215 (of the communication device 20-1 (transmission source)), and outputs the communication packet to the plain text communication generating unit 32 (step S301).

The plain text communication generating unit 32 acquires the encryption key (group key) stored in the encrypted communication information storage unit 36 (step S302). As an example, the plain text communication generating unit 32 acquires the group key stored in the encrypted communication information storage unit 36 on the basis of the transmission destination identifier provided to the encrypted communication packet.

The plain text communication generating unit 32 generates a communication packet in a state of a plain text by decrypting the encrypted communication packet using the acquired group key, and outputs the communication packet to the plain text communication analysis requesting unit 33 (step S303).

Note that, in a case where the plain text communication generating unit 32 fails in the decryption processing in step S303, because there is a possibility that the communication packet is encrypted using an incorrect key, as an example, the plain text communication generating unit 32 may discard the encrypted communication packet.

The plain text communication analysis requesting unit 33 transmits the plain text communication packet to the analysis device 40 (step S304). Note that the plain text communication analysis requesting unit 33 may further transmit information to be used for analysis of the communication packet to the analysis device 40. For example, the information to be used for analysis of the communication packet is time at which the communication packet is received, a white list managed by the communication device 20-1 (transmission source), other communication packets which have been previously received, or the like.

After step S304, the communication packet is analyzed by the analysis device 40. After the communication packet is analyzed by the analysis device 40, the control device 30 performs processing again. The analysis result notifying unit 34 receives the analysis result of the communication packet from the analysis device 40 (step S305). The analysis result notifying unit 34 displays the analysis result at the display device 50 (step S306).

The operator can recognize the analysis result by browsing display of the display device 50. The operator may change various kinds of settings in accordance with the analysis result.

As an example, the operator may change settings of a control server (not shown) of the equipment 10 (transmission source) to interrupt transmission of unauthorized communication from the equipment 10 (transmission source). Further, the operator may change settings of a control server (not shown) of the equipment 10 (transmission destination) to interrupt reception of unauthorized communication of the equipment 10 (transmission destination).

Figure 6:
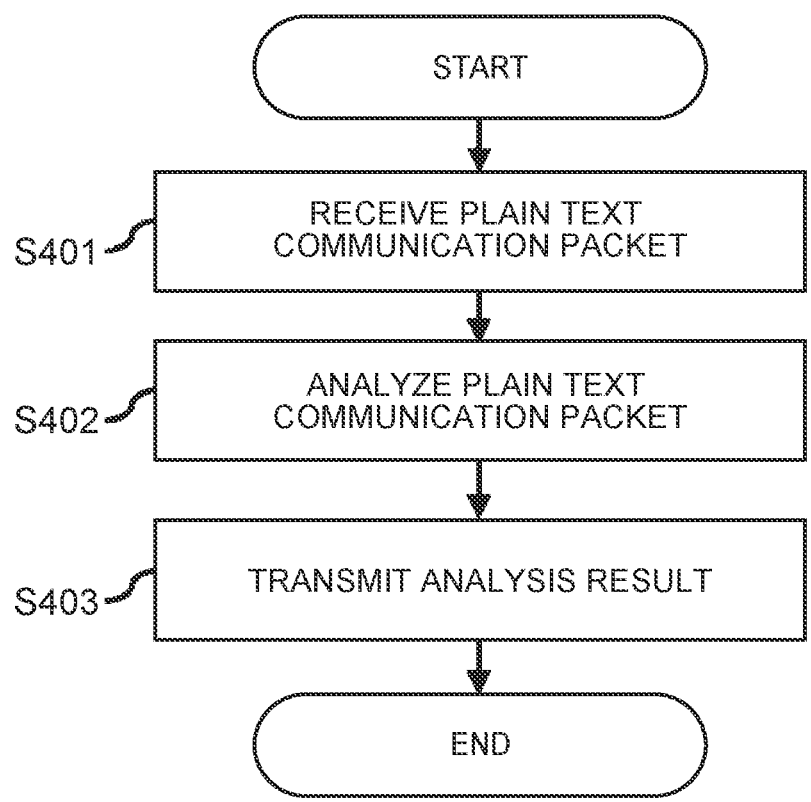
FIG. 6 is a flowchart showing processing procedure of an analysis device according to the first embodiment.

Next, processing of the analysis device 40 will be described. FIG. 6 is a flowchart showing an example of processing procedure of the analysis device 40.

The plain text communication receiving unit 41 receives the communication packet from the plain text communication analysis requesting unit 33 (of the control device 30), and outputs the communication packet to the plain text communication analyzing unit 42 (step S401). Note that, in a case where the plain text communication analysis requesting unit 33 also transmits information to be used for analysis of the communication packet, the plain text communication receiving unit 41 also receives this information.

The plain text communication analyzing unit 42 judges whether or not communication is unauthorized communication by analyzing the communication packet and outputs the analysis result to the analysis result transmitting unit 43 (step S402).

As an example, the plain text communication analyzing unit 42 examines whether or not a byte character string which is characteristic of unauthorized communication is included in a byte character string included in a payload, and judges that the communication is unauthorized communication if the byte character string which is characteristic of unauthorized communication is included. Further, as another example, the plain text communication analyzing unit 42 examines whether or not control information included in the payload falls within a possible range of normal communication, and judges that the communication is unauthorized communication if the control information is out of the range.

In a case where it is confirmed (by the plain text communication analyzing unit 42) that unauthorized communication occurs, the plain text communication analyzing unit 42 may further generate information necessary for providing conditions for discarding unauthorized communication, and may also output this information to the analysis result transmitting unit 43 in addition to the analysis result described above.

The information necessary for providing conditions for discarding unauthorized communication is, for example, a transmission source MAC address, a transmission source IP address, a transmission source port number, a transmission destination MAC address, a transmission destination IP address, a transmission destination port number, information regarding the transmission source and the transmission destination (such as identifiers provided to the equipment), a characteristic byte character string included in the payload, a communication frequency, or the like.

The analysis result transmitting unit 43 transmits the analysis result to the analysis result notifying unit 34 (step S403).

Note that, in a case where the plain text communication analyzing unit 42 has also output the conditions for discarding unauthorized communication, the analysis result transmitting unit 43 also transmits this information to the analysis result notifying unit 34. Further, the analysis result transmitting unit 43 may also transmit information from which relationship with the communication packet to be analyzed is known, to the analysis result notifying unit 34. Here, the information from which relationship with the communication packet to be analyzed is known is, for example, a reception time of the communication packet at the control device 30, a hash value of the communication packet, or the like.

Figure 7:
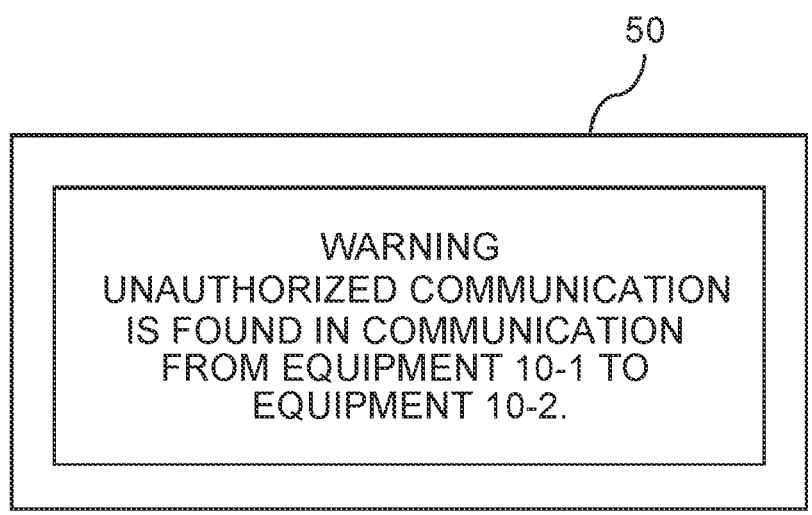
FIG. 7 is a schematic diagram showing an example of a display screen of a display device according to the first embodiment.

FIG. 7 is a view showing an example of a display screen of the display device 50. For example, a case will be considered where the analysis device 40 judges that communication from the equipment 10-1 (transmission source)

to the equipment 10-2 (transmission destination) is unauthorized communication, and the control device 30 causes this result to be displayed at the display device 50.

The operator can recognize that communication from the equipment 10-1 (transmission source) to the equipment 10-2 (transmission destination) is unauthorized communication by browsing display of the display device 50 shown in FIG. 7.

Effects of First Embodiment

In the communication device 20-1 (transmission source) of the information processing system 1 of the first embodiment, the communication packet judged by the simplified communication analyzing unit 212 that further analysis is required is encrypted using the group key at the encrypted communication generating unit 214. The encrypted communication packet is transmitted to two transmission destinations of the control device 30 and the communication device 20-2 (original transmission destination) by the encrypted communication transmitting unit 215.

The control device 30 requests analysis of the communication packet for which necessity of analysis is high to the analysis device 40, and the analysis device 40 analyzes the communication packet.

The communication device 20-2 (transmission destination) receives the communication packet encrypted by the communication device 20-1 (transmission source), further decrypts the encrypted communication packet using the group key, and transmits the communication packet in a state of a plain text to the equipment 10-2 (transmission destination). Therefore, encryption processing is performed once, and decryption processing is performed once until the equipment 10-2 (transmission destination) receives the communication packet from the equipment 10-1 (transmission source).

In the system of related art, a communication device connected to an equipment (transmission source) performs encryption processing, and an external device (for analysis) performs analysis after performing decryption processing. Further, after the decrypted communication packet is analyzed, the communication device (transmission source) or the external device (for analysis) performs encryption processing of the communication packet again to perform communication with a communication device connected to an equipment (original transmission destination). Thereafter, the communication device (transmission source) or the external device (for analysis) transmits the communication packet to the communication device connected to the equipment (original transmission destination). After decryption processing of the communication packet is performed at the communication device connected to the equipment (original transmission destination), the equipment (original transmission destination) receives the communication packet. Therefore, in the system of related art, due to encryption processing being performed twice, and decryption processing being performed twice, communication delay occurs.

In the information processing system 1 of the present embodiment, the communication device 20-2 (transmission destination) can acquire the encrypted communication packet from the communication device 20-1 (transmission source) without waiting for decryption processing performed by the control device 30 (for analysis by the analysis device 40) and analysis by the analysis device 40.

Therefore, in the information processing system 1, it is possible to precisely analyze a communication packet for which precise analysis is required while realizing encrypted communication for the communication device 20-2 (transmission destination) which is the original transmission destination.

Briefly, in the information processing system 1 of the present embodiment, it is only necessary to execute encryption processing once and decryption processing once in communication from the equipment 10-1 (transmission source) to the equipment 10-2 (transmission destination) while precise analysis of the communication packet is performed by the analysis device 40. As a result, in comparison with the information processing system in related art that requires two times of encryption processing and two times of decryption processing, it is possible to reduce the communication delay.

Therefore, the communication device 20 of the present embodiment can realize a communication packet transmission function in which communication delay is reduced through encrypted communication processing.

Further, by the control device 30 receiving a judgment result (analysis result of the communication packet) by the analysis device 40 as to whether or not unauthorized communication occurs, and by causing the judgment result to be displayed at the display device 50, it is possible to notify the operator who operates the information processing system 1 as to whether or not unauthorized communication occurs.

The operator who has recognized unauthorized communication can interrupt transmission of unauthorized communication by operating a control server (not shown) of the equipment 10 (transmission source). Further, the operator can interrupt reception of unauthorized communication by operating a control server (not shown) of the equipment 10 (transmission destination).

Note that the present invention is not limited to the first embodiment as is, and can be implemented while components are transformed within a scope not deviating from the gist in an implementation phase. Further, various inventions can be formed by appropriate combination of a plurality of components disclosed in the embodiment. For example, some components may be deleted from all components described in the embodiment.

Modification of the First Embodiment

It is assumed in the first embodiment that, in a case where the plain text communication generating unit 222 of the communication device 20-2 (transmission destination) fails in decryption of the communication packet, the communication packet is discarded.

In a case where unauthorized communication is found in communication from the equipment 10-1 (transmission source) to the equipment 10-2 (transmission destination), the group key to be shared by the communication device 20-1 (transmission source) and the communication device 20-2 (transmission destination) may be updated by the operator's judgment. By this means, the communication packet from the communication device 20-1 (transmission source) to the communication device 20-2 (transmission destination) cannot be decrypted by the plain text communication generating unit 222 of the communication device 20-2 (transmission destination). Therefore, because it is set such that the plain text communication generating unit 222 discards communication in a case where decryption of the communication packet is failed, it is possible to interrupt communication from the communication device 20-1 (transmission source) to the communication device 20-2 (transmission destination).

As a result, it is possible to interrupt unauthorized communication by executing key update processing without adding a new function to the communication device 20-2 (transmission destination).

Second Embodiment

Explanation of Outline and Configuration of the Second Embodiment

Figure 8:
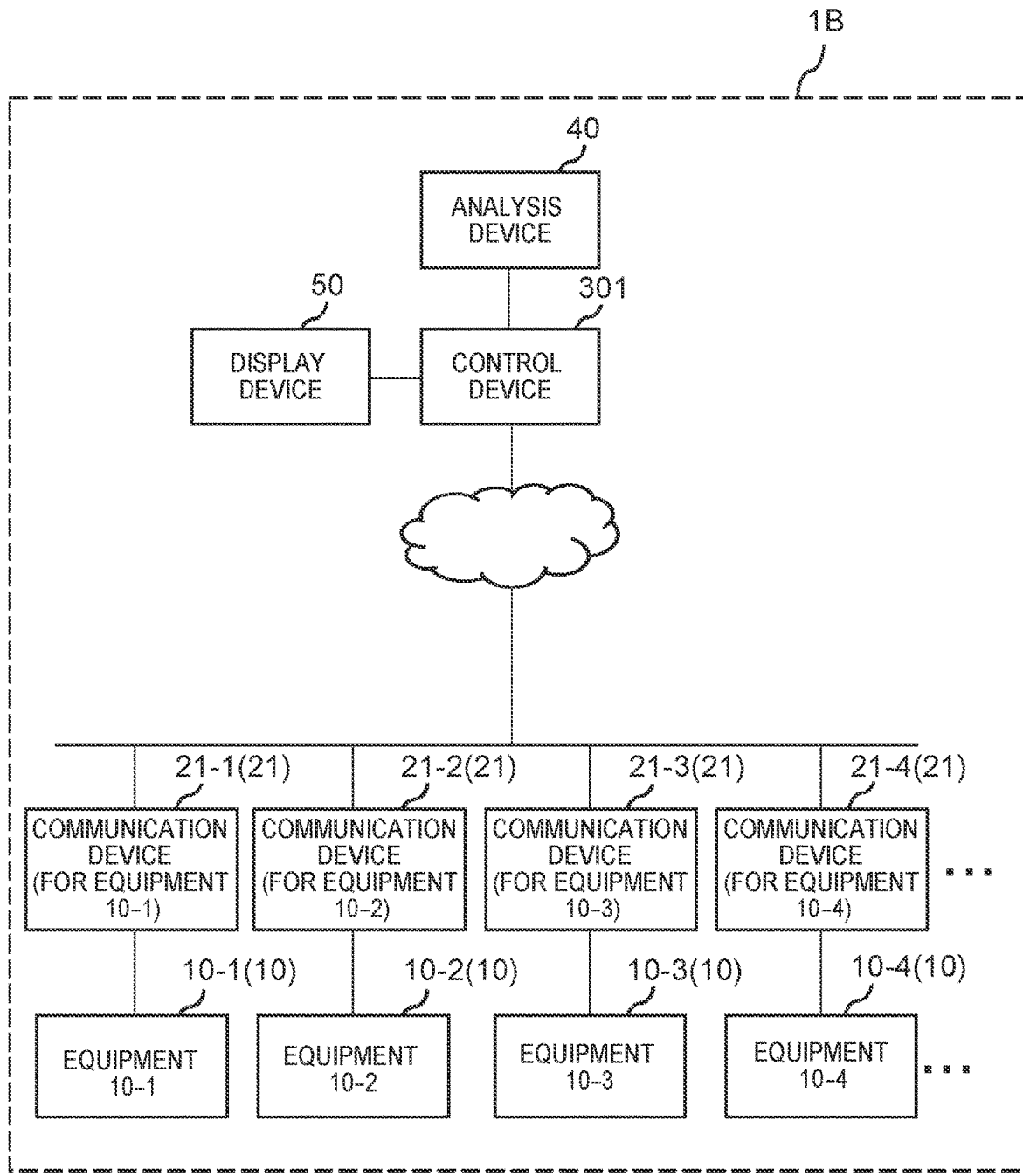
FIG. 8 is a schematic diagram of an information processing system according to a second embodiment.

FIG. 8 is a schematic diagram showing an example of a configuration of an information processing system 1B according to the second embodiment. In the second embodiment, the same reference numerals as those of the first embodiment will be assigned to components which are similar to those of the first embodiment, and detailed description will be omitted.

As shown in FIG. 8, the information processing system 1B according to the second embodiment is different from that of the first embodiment in that a control device 301 is provided in place of the control device 30 in the first embodiment, and a plurality of communication devices 21 (communication devices 21-1, 21-2, 21-3, and 21-4) is provided in place of the plurality of communication devices 20 in the first embodiment.

Corresponding equipment 10 (equipment 10-1, 10-2, 10-3, and 10-4) is connected to the respective communication devices 21.

In the following description, for the purpose of explanation, a case will be considered where the equipment 10-1 (10) is the transmission source, and the equipment 10-2 (10) is the transmission destination. In this case, the communication device 21-1 (21) becomes a communication device of the transmission source, and the communication device 21-2 (21) becomes a communication device of the transmission destination.

Figure 9:
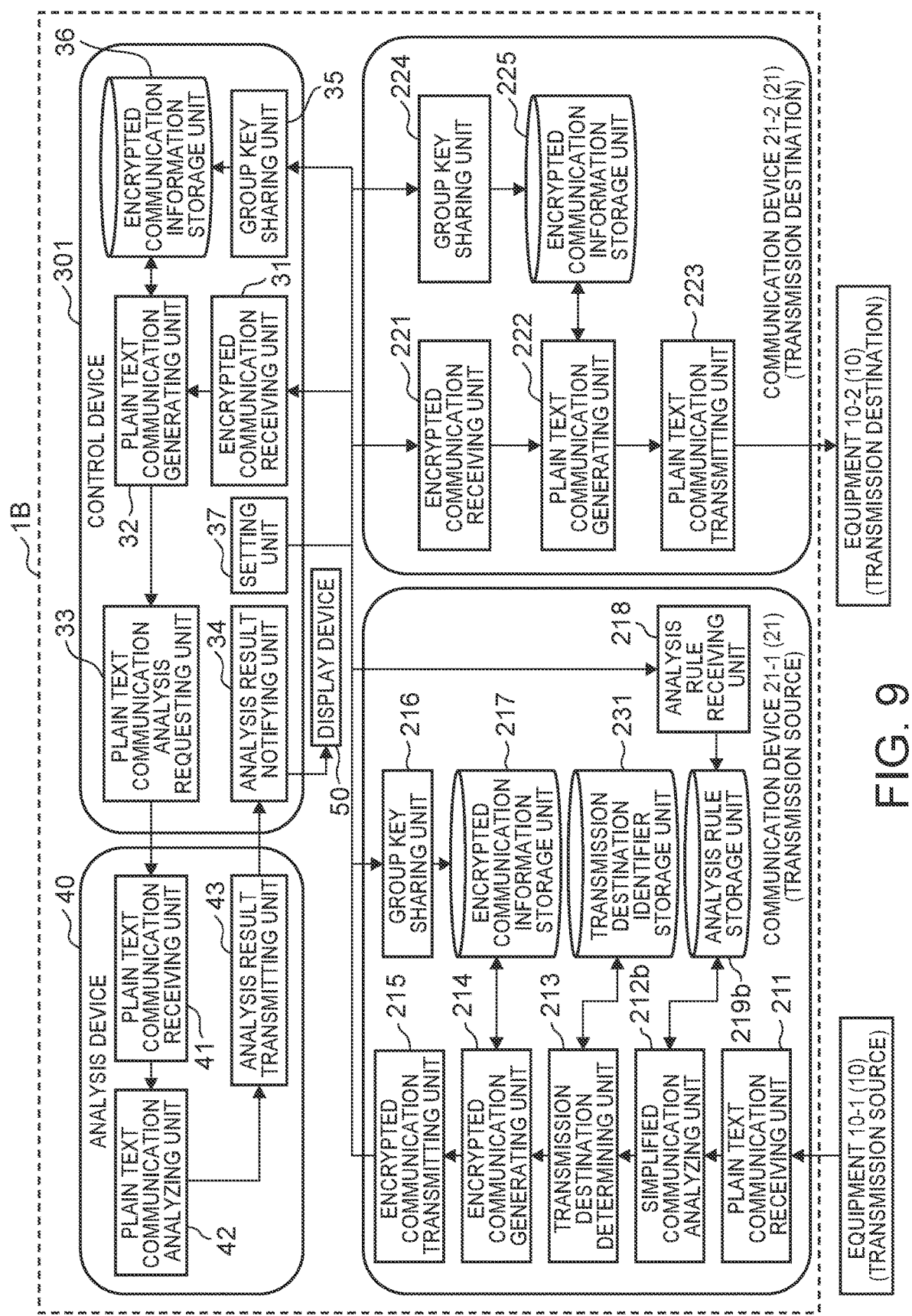
FIG. 9 is a functional block diagram of the information processing system according to the second embodiment.

FIG. 9 is a functional block diagram of the information processing system 1B according to the second embodiment.

The communication device 21-1 (transmission source) is different from the communication device 20-1 (transmission source) in the first embodiment in that a simplified communication analyzing unit 212b is provided in place of the simplified communication analyzing unit 212, an analysis rule storage unit 219b is provided in place of the analysis rule storage unit 219, and an analysis rule receiving unit 218 is newly provided.

The analysis rule receiving unit 218 receives an analysis rule from the setting unit 37 of the control device 301 (will be described later), and outputs the received analysis rule to the analysis rule storage unit 219b. Through this process, it becomes possible to update the analysis rule stored in the analysis rule storage unit 219b.

The analysis rule stored in the analysis rule storage unit 219b includes white list information and unauthorized communication packet information. Other points are similar to the analysis rule storage unit 219.

Here, the unauthorized communication packet information is information for judging that the communication packet is suspected to be unauthorized. The unauthorized communication packet information is, for example, information included in the communication packet which has been previously judged as unauthorized communication by the analysis device 40. For example, the unauthorized communication packet information is a binary string included in a payload of the communication packet which has been previously judged as unauthorized communication by the analysis device 40.

The simplified communication analyzing unit 212b acquires an analysis rule from the analysis rule storage unit 219b, and judges whether or not information included in the communication packet (target of simplified communication analysis) is included in the white list information.

In a case where the simplified communication analyzing unit 212b judges that the information included in the communication packet is not included in the white list information, the simplified communication analyzing unit 212b discards the communication packet.

In a case where the information included in the communication packet is included in the white list information, the simplified communication analyzing unit 212b further judges whether or not the information included in the communication packet is one of information included in the unauthorized communication packet information.

In a case where the information included in the communication packet is one of the information included in the unauthorized communication packet information, the simplified communication analyzing unit 212b judges that the information included in the communication packet is included in the unauthorized communication packet information. That is, the communication packet is suspected to be unauthorized.

Further, in a case where the information included in the communication packet is not one of the information included in the unauthorized communication packet information, the simplified communication analyzing unit 212b judges that the information included in the communication packet is not included in the unauthorized communication packet information. That is, the communication packet is not suspected to be unauthorized.

The simplified communication analyzing unit 212b outputs the communication packet and the judgment result to the transmission destination determining unit 213.

In a case where the transmission destination determining unit 213 acquires the judgment result indicating that "the information included in the communication packet is included in the unauthorized communication packet information (the communication packet is suspected to be unauthorized)", the transmission destination determining unit 213 determines the control device 301 and the communication device 21-2 (original transmission destination) as the transmission destinations of the communication packet, and selects corresponding identifiers.

Further, in a case where the transmission destination determining unit 213 acquires the judgment result indicating that "the information included in the communication packet is not included in the unauthorized communication packet information (the communication packet is not suspected to be unauthorized)", the transmission destination determining unit 213 determines the communication device 21-2 (original transmission destination) as the transmission destination of the communication packet, and selects corresponding identifiers.

The control device 301 is different from the control device 30 according to the first embodiment in that a setting unit 37 is newly provided. The setting unit 37 accepts an input of the analysis rule through an input from the outside by the operator, and further transmits the analysis rule to the analysis rule receiving unit 218. Through this process, it is possible to change the analysis rule stored in the analysis rule storage unit 219b.

Figure 10:
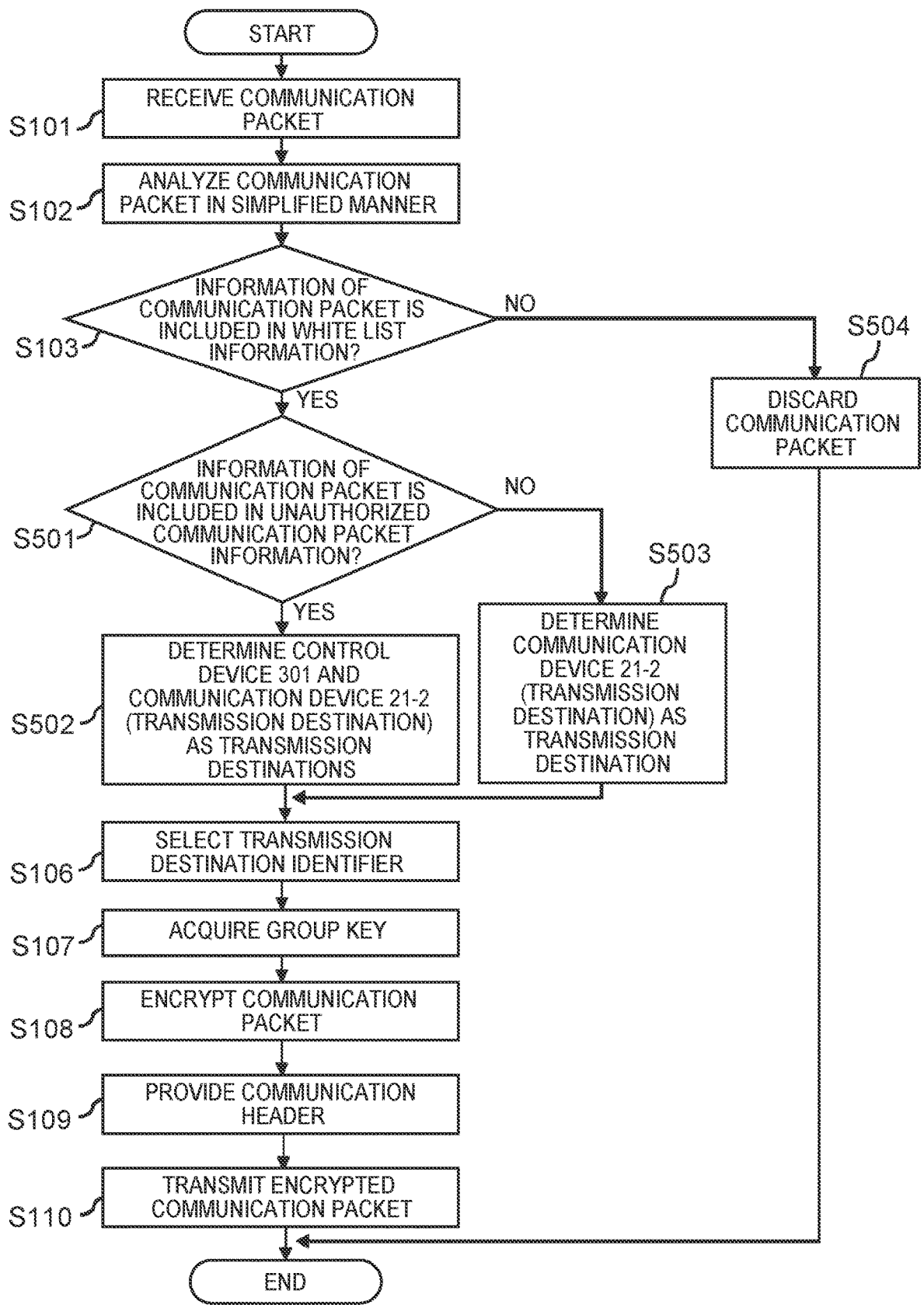
FIG. 10 is a flowchart showing processing procedure of a communication device (transmission source) according to the second embodiment.

Description of Processing Procedure of the Information Processing System According to the Second Embodiment Next, processing procedure of the information processing system 1B according to the second embodiment will be described. FIG. 10 is a flowchart showing an example of processing to be executed by the communication device 21-1 (transmission source) according to the second embodiment. Because processing from step S101 to step S103 and from step S106 to step S110 is similar to that in the first embodiment, detailed description will be omitted.

The simplified communication analyzing unit 212b judges whether or not information included in a target communication packet is included in the white list information in step S103.

In a case where the information included in the communication packet is not included in the white list information (step S103: No), the simplified communication analyzing unit 212b discards the communication packet (step S504). Then, the processing is finished.

In step S103, in a case where the information included in the communication packet is included in the white list information, the processing transitions to step S501. In step S501, whether or not the information included in the communication packet is one of information included in the unauthorized communication packet information is judged.

In a case where the information included in the communication packet matches one of the unauthorized communication packet information, the simplified communication analyzing unit 212b judges that the information included in the communication packet is included in the unauthorized communication packet information (the communication packet is suspected to be unauthorized). The simplified communication analyzing unit 212b transmits the communication packet and the judgment result indicating that "the information is included in the unauthorized communication packet information (further analysis is required)" to the transmission destination determining unit 213. Then, the processing transitions to step S502.

In step S502, the transmission destination determining unit 213 determines the control device 301 and the communication device 21-2 (original transmission destination) as the transmission destinations.

In a case where the information included in the communication packet does not match one of the unauthorized communication packet information in step S501, the simplified communication analyzing unit 212b judges that the information included in the communication packet is not included in the unauthorized communication packet information (the communication packet is not suspected to be unauthorized). The simplified communication analyzing unit 212b transmits the communication packet and the judgment result indicating that "the information included in the communication packet is not included in the unauthorized communication packet information (further analysis is not required)" to the transmission destination determining unit 213.

Then, the processing transitions to step S503. In step S503, the transmission destination determining unit 213 determines the communication device 21-2 (original transmission destination) as the transmission destination.

Processing from step S106 to step S110 is similar to that of the communication device 20-1 according to the first embodiment.

Next, procedure for changing the analysis rule stored in the analysis rule storage unit 219b will be described.

Figure 11:
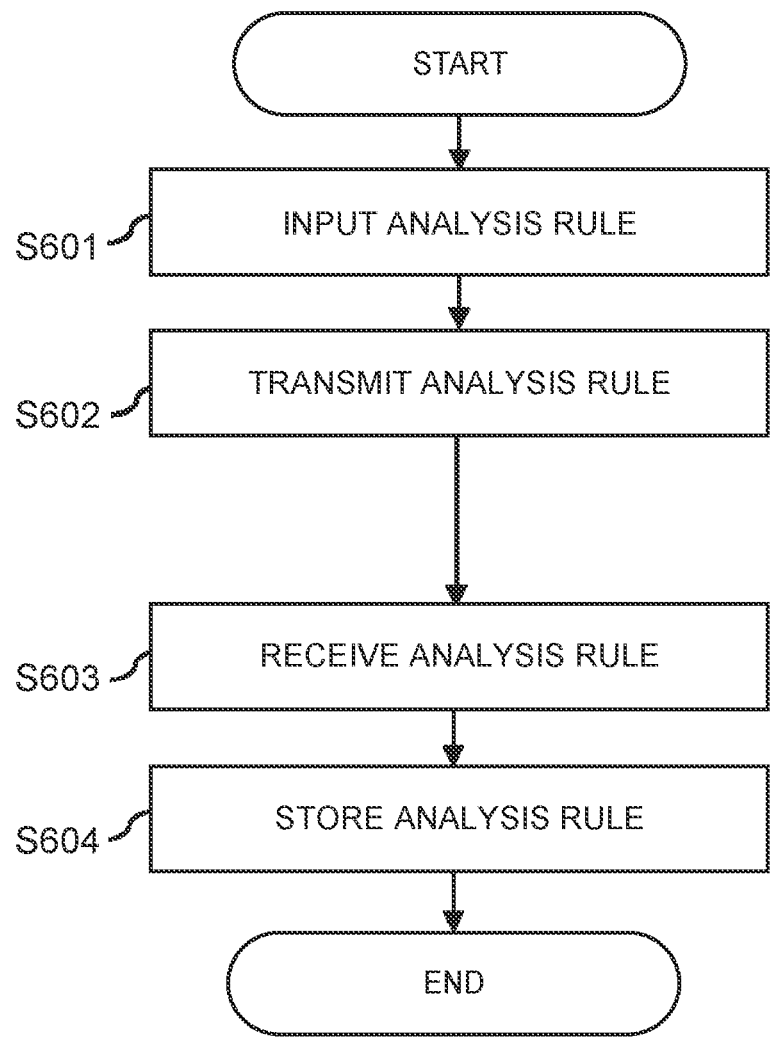
FIG. 11 is a flowchart showing procedure for changing an analysis rule.

FIG. 11 is a flowchart for changing the analysis rule stored in the analysis rule storage unit 219b to be performed by the operator.

The operator inputs an analysis rule in the setting unit 37 (step S601). For example, among the analysis rule, IP addresses of the communication device 21-1 (transmission source) and the communication device 21-2 (transmission destination) for which communication is judged as unauthorized are deleted from the white list information. For example, among the analysis rule, the unauthorized communication packet information is a binary string included in a payload of the communication packet to be analyzed, when it is judged that communication is unauthorized.

The setting unit 37 transmits the analysis rule to the analysis rule receiving unit 218 (step S602).

The analysis rule receiving unit 218 of the communication device 21-1 (transmission source) receives the analysis rule from the setting unit 37, and outputs the analysis rule to the analysis rule storage unit 219b (step S603).

The analysis rule storage unit 219b stores the analysis rule acquired from the analysis rule receiving unit 218 (step S604). Then, the processing is finished. Through this processing, the analysis rule storage unit 219b stores a new analysis rule.

After the analysis rule is changed, in step S103 in FIG. 10, the simplified communication analyzing unit 212b uses new white list information. For example, in a case where the analysis device 40 has previously judged that communication to the communication device 21-2 (transmission destination) is unauthorized, it is assumed that an IP address of the communication device 21-2 (transmission destination) is deleted from the white list information by the operator.

In this case, in a case where the transmission destination of the communication packet is the communication device 21-2 (transmission destination) in step S103 after the analysis rule is changed, the communication device 21-2 (transmission destination) is not included in the white list. As a result, the communication packet is discarded. By this means, it is possible to interrupt unauthorized communication.

Further, in judgment by the simplified communication analyzing unit 212b in step S501 in FIG. 10, because the simplified communication analyzing unit 212b uses new unauthorized communication packet information, the communication packet which includes the same binary string (in a payload) as that of the communication packet for which communication is judged as unauthorized (by the analysis device 40) is suspected to be an unauthorized communication packet. Therefore, this communication packet is transmitted to the communication device 21-2 (original transmission destination) and the control device 301.

As a result, in a case where the communication packet is suspected to be unauthorized, it is possible to precisely analyze the communication packet by transmitting the communication packet also to the control device 301.

Effects of the Second Embodiment

In the communication device 21-1 (transmission source) according to the second embodiment, the analysis rule inputted by the operator is stored in the analysis rule storage unit 219b via the control device 301. In a case where the information included in the communication packet is not included in the white list information, the simplified communication analyzing unit 212b discards the communication packet. Therefore, by deleting communication header information (or the like) of the communication packet which has been previously judged as unauthorized from the white list information, it is possible to interrupt unauthorized communication.

Further, the communication device 21-1 (transmission source) encrypts the communication packet which is suspected to be unauthorized through judgment by the simplified communication analyzing unit 212 using the unauthorized communication packet information, using the group key at the encrypted communication generating unit 214. The encrypted communication transmitting unit 215 transmits the encrypted communication packet to two transmission destinations of the control device 301 and the communication device 21-2 (original transmission destination).

Therefore, the communication device 21-2 (original transmission destination) can, in a similar manner to the communication device 20-2 (original transmission destination) according to the first embodiment, acquire the encrypted communication packet from the communication device 21-1 (transmission source) without waiting for decryption processing by the control device 301 and analysis processing by the analysis device 40. Further, the control device 301 can request analysis of the communication packet for which necessity of analysis is high to the analysis device 40.

As a result, the communication device 21 of the second embodiment can realize a communication packet transmission function in which communication delay is reduced through encrypted communication processing.

Modification of the Second Embodiment

In the second embodiment, the control device 301 groups in advance the communication devices 21 in accordance with types of the connected equipment 10 connected thereto. For example, in a case where the equipment 10-1 and the equipment 10-3 are both PCs, it is judged that the equipment 10-1 and the equipment 10-3 are the same type, and the communication device 21-1 and the communication device 21-3 connected to the equipment 10-1 and the equipment 10-3 respectively are grouped as group 1.

In a case where communication from the equipment 10-1 (transmission source) to the equipment 10-2 (transmission destination) is considered, it is assumed that unauthorized communication is performed from the equipment 10-1 (transmission source) by the equipment 10-1, for example, becoming infected with malware A. In this case, because the type of the equipment 10-3 is the same as the type of the equipment 10-1, there is a possibility that the equipment 10-3 becomes infected with the malware A with which the equipment 10-1 becomes infected.

When the operator recognizes unauthorized communication in communication from the equipment 10-1 (transmission source) to the equipment 10-2 (transmission destination) through display at the display device 50, the operator not only changes settings of the white list of the communication device 21-1 (transmission source) but also changes settings of the white list of the communication device 21-3. By this means, it is possible to interrupt in advance communication from the equipment 10-3 likely to be infected with the malware A because the type of the equipment 10-3 is the same as the type of the equipment 10-1, so that it is possible to prevent other equipment 10 from becoming infected with malware.

Third Embodiment

Figure 12:
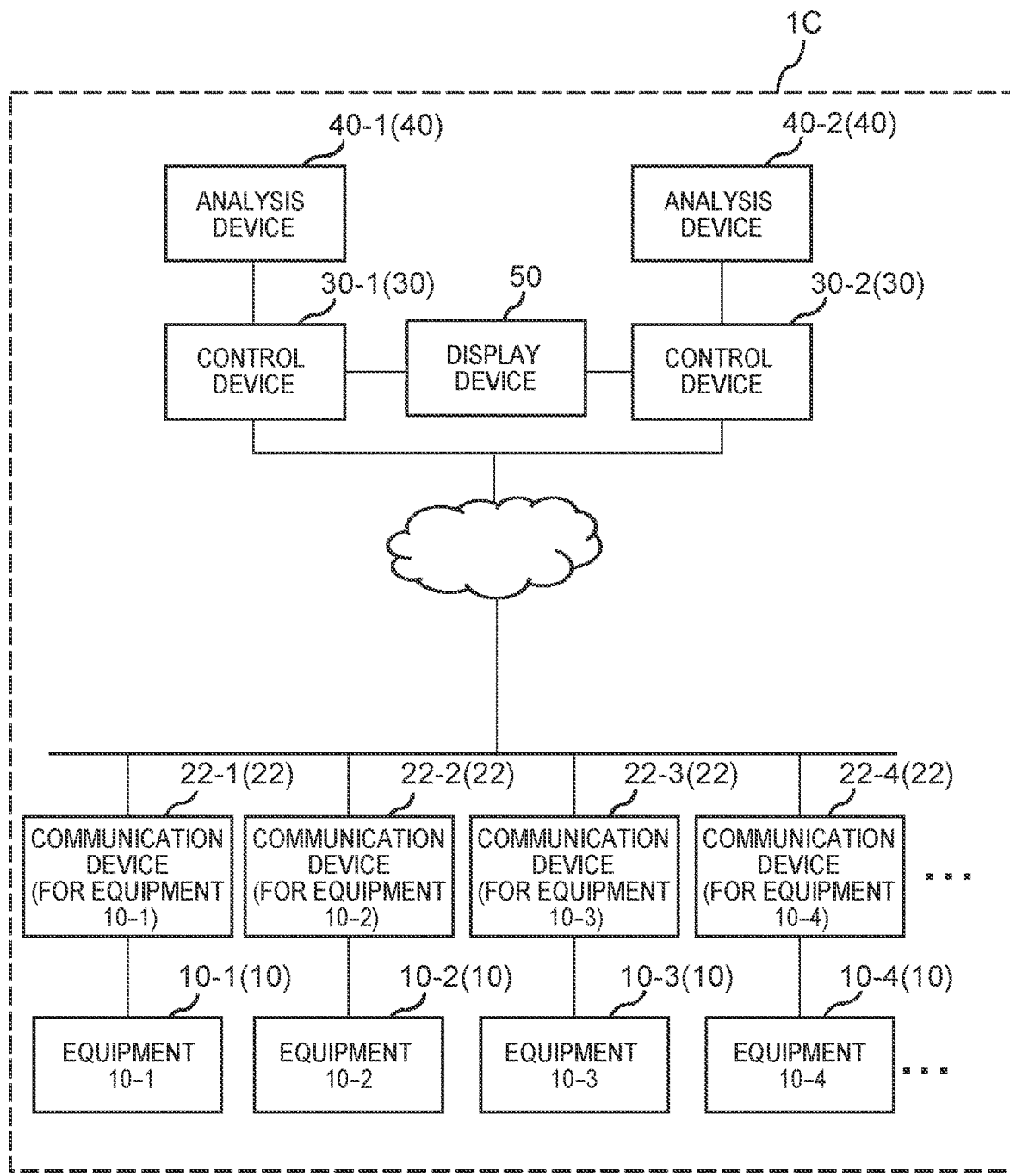
FIG. 12 is a schematic diagram of an information processing system according to a third embodiment.

FIG. 12 is an information processing system 1C according to the third embodiment. In the third embodiment, the same reference numerals as those of the first embodiment will be assigned to the same components, and detailed description will be omitted.

As shown in FIG. 12, the information processing system 1C includes a plurality of communication devices 22 (communication devices 22-1, 22-2, 22-3, and 22-4), a plurality of control devices 30 (control devices 30-1 and 30-2), a plurality of analysis devices 40 (analysis devices 40-1 and 40-2), and a display device 50.

Corresponding equipment 10 (equipment 10-1, 10-2, 10-3, and 10-4) is connected to the respective communication devices 22.

The information processing system 1C is different from the information processing system 1 according to the first embodiment in that the communication devices 22, a plurality of control devices 30-1 and 30-2 are provided, and a plurality of analysis devices 40-1 and 40-2 are provided. It is only necessary to provide two or more sets of the control device 30 and the analysis device 40.

Communication from the communication device 22-1 (transmission source) to the communication device 22-2 (transmission destination) will be considered below.

Figure 13:
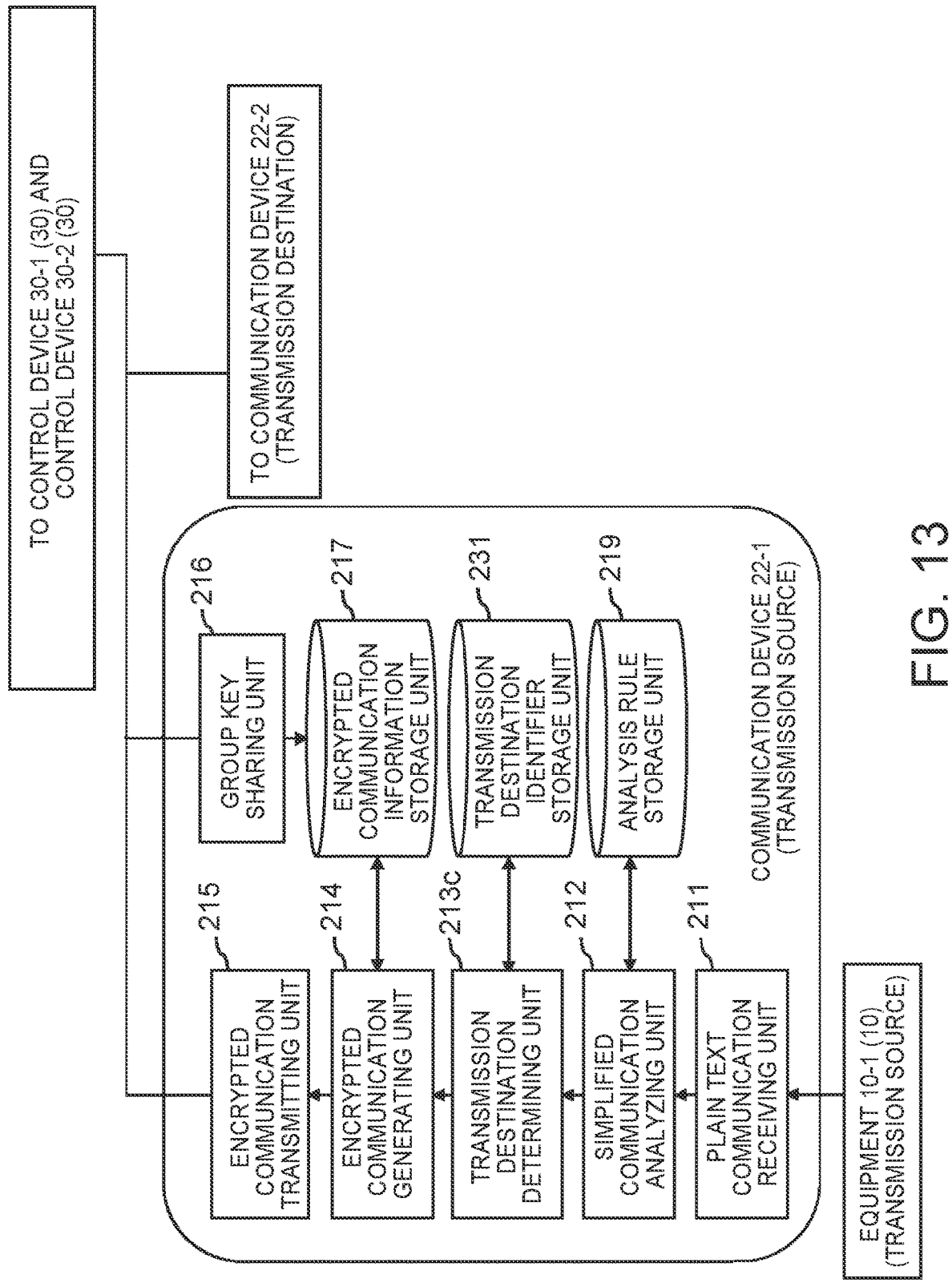
FIG. 13 is a functional block diagram of a communication device according to the third embodiment.

FIG. 13 is a functional block diagram of the communication device 22-1 (transmission source) according to the third embodiment. As shown in FIG. 13, the communication device 22-1 (transmission source) is different from the communication device 20-1 (transmission source) in that a transmission destination determining unit $213c$ is provided in place of the transmission destination determining unit 213.

In a case where analysis of the communication packet is required, the transmission destination determining unit $213c$ determines one of the plurality of control devices 30-1 and 30-2 as the transmission destination.

As an example, the transmission destination determining unit $213c$ of the communication device 22 (transmission source) may allocate different numbers respectively to the plurality of control devices 30 (control devices 30-1 and 30-2), and may determine the transmission destination in ascending order of the numbers (in a round-robin manner) in order of arrival of the communication packets.

Further, as another example, the transmission destination determining unit $213c$ may allocate different numbers to the plurality of control devices 30-1 and 30-2, and may determine the control device to which the communication packet is to be transmitted among the control devices 30-1 and 30-2 on the basis of a residue value of a hash value of the communication packet at the number of control devices.

One of the control devices 30-1 and 30-2 which has received the communication packet requests analysis of the communication packet (judgment as to whether or not unauthorized communication occurs) to the analysis device 40 (one of 40-1 and 40-2) connected to the own device. As an example, in a case where the control device 30-1 has received the communication packet, the control device 30-1 requests analysis to the analysis device 40-1.

According to the information processing system 1C of the third embodiment, it is possible to cause a plurality of analysis devices 40-1 and 40-2 to execute processing in a dispersed manner. The control devices 30-1 and 30-2 can efficiently acquire the analysis result of the communication packet (judgment result as to whether or not unauthorized communication occurs) and can notify the operator of the analysis result via the display device 50.

Modification of the Third Embodiment

Figure 14:
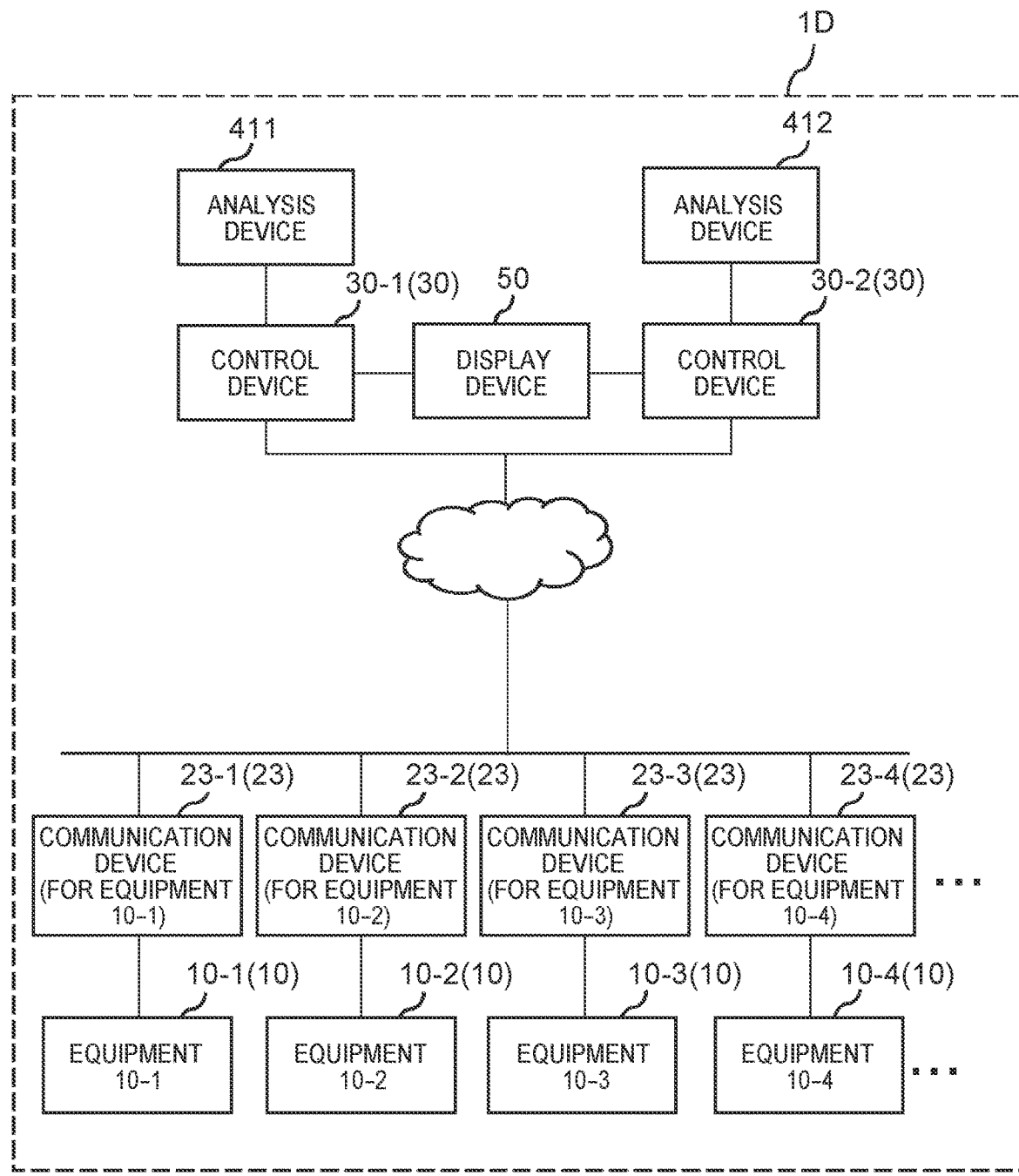
FIG. 14 is a schematic diagram of an information processing system according to a modification of the third embodiment.

FIG. 14 is a schematic diagram of an information processing system 1D according to a modification of the third embodiment. The information processing system 1D includes a plurality of control devices 30-1 and 30-2, a plurality of analysis devices 411 and 412, and a plurality of communication devices 23 (communication devices 23-1, 23-2, 23-3, and 23-4). As shown in FIG. 14, the analysis device 411 is connected to the control device 30-1, and the analysis device 412 is connected to the control device 30-2.

The analysis device 411 is appropriate for analysis of protocol in an information system such as hypertext transfer protocol (HTTP) and domain name system (DNS). Further, the analysis device 412 is appropriate for analysis of protocol in a control system such as Modbus.

The analysis device 411 is different from the analysis device 412 in that whether the analysis device is appropriate for analysis of a communication packet of protocol in the information system or is appropriate for analysis of a communication packet of protocol in the control system. Further, respective functional parts of the analysis devices 411 and 412 are similar to those of the analysis device 40 described in the first embodiment, and the analysis devices 411 and 412 have the same function as the analysis device 40.

Figure 15:
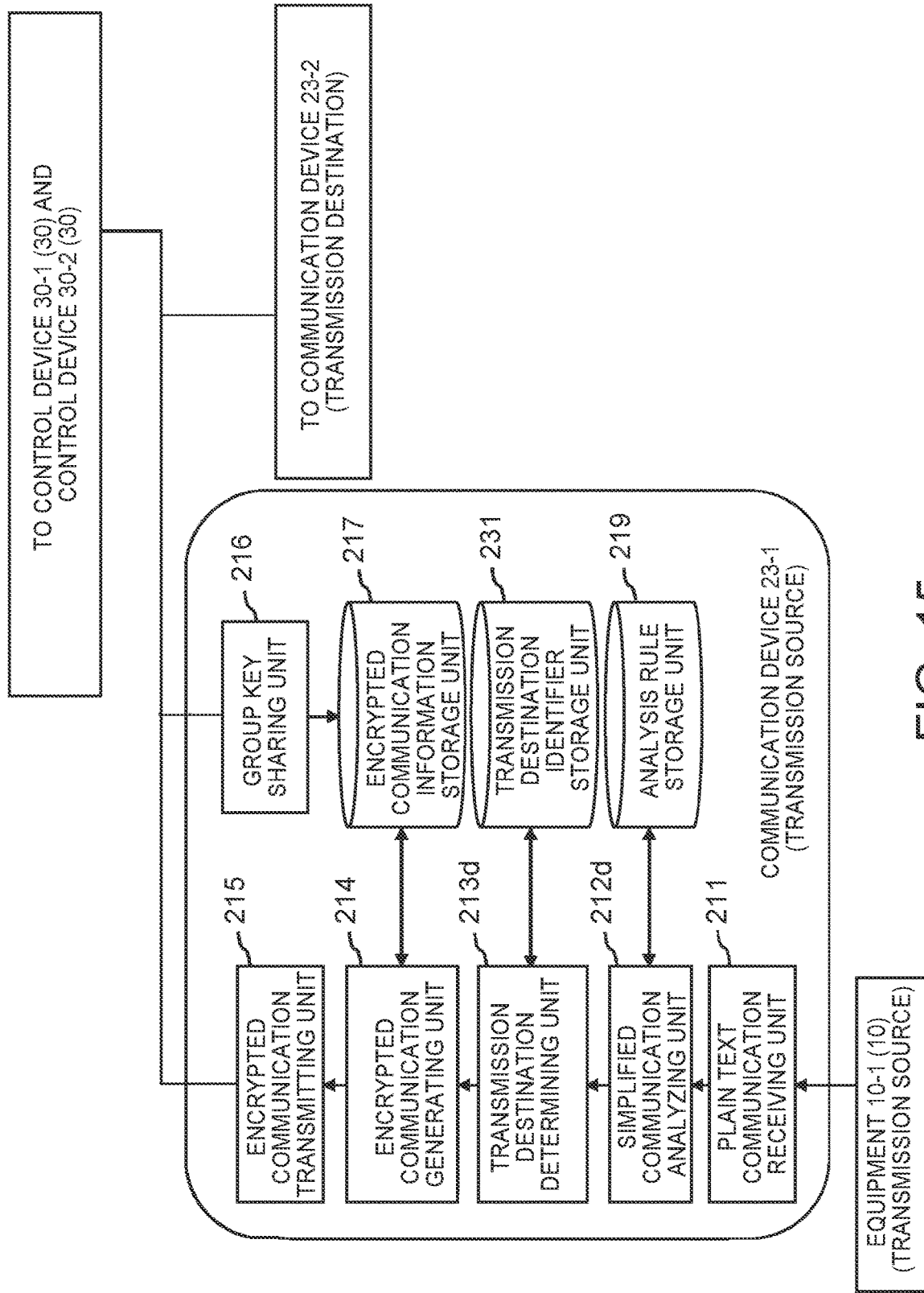
FIG. 15 is a functional block diagram of a communication device according to the modification of the third embodiment.

FIG. 15 is a functional block diagram of a communication device 23-1 (transmission source) according to the modification of the third embodiment. As shown in FIG. 15, the communication device 23-1 (transmission source) is different from the communication device 22-1 (transmission source) in FIG. 13 in that a simplified communication analyzing unit 212d is provided in place of the simplified communication analyzing unit 212 in FIG. 2, and a transmission destination determining unit 213d is provided in place of the transmission destination determining unit 213c in FIG. 13. Other functions are similar to those of the communication device 22-1 (transmission source).

The simplified communication analyzing unit 212d analyzes a type of communication protocol which is being used by the communication packet, and determines whether the communication packet is protocol in the information system or protocol in the control system, in addition to the functions of the simplified communication analyzing unit 212c.

The transmission destination determining unit 213d determines any of the control devices 30-1 and 30-2 to which the communication packet should be transmitted, in accordance with the type of the communication protocol.

As an example, the simplified communication analyzing unit 212d determines whether the communication packet is appropriate for analysis by the analysis device 411 (protocol in the information system) or appropriate for analysis by the analysis device 412 (protocol in the control system) using a list created in advance (list of sets of transmission destination port numbers and types of protocol) on the basis of a transmission destination port number of the communication packet. The transmission destination determining unit 213d determines to include the control device 30-1 as the transmission destination if the protocol is in the information system, and include the control device 30-2 as the transmission destination if the protocol is in the control system.

In the information processing system 1D in the modification of the third embodiment, any of the control device 30-1 connected to the analysis device 411 which is appropriate for analysis of protocol in the information system and the control device 30-2 connected to the analysis device 412 which is appropriate for analysis of protocol in the control system is determined as the transmission destination, in addition to the effects of the information processing system 1C in the third embodiment.

That is, in a case where communication protocol used by the communication packet is protocol in the information system, the analysis device 411 which excels at analysis of a communication packet of protocol in the information system can perform analysis. Further, in a similar manner, in a case where the communication protocol used by the communication packet is protocol in the control system, the analysis device 412 which excels at analysis of a communication packet of protocol in the control system can perform analysis.

Therefore, in addition to the effects of the information processing system 1C according to the third embodiment, the information processing system 1D can analyze the communication packet at an appropriate analysis device for each type of communication protocol used by the communication packet, so that it is possible to analyze the communication packet with high accuracy.

Fourth Embodiment

Figure 16:
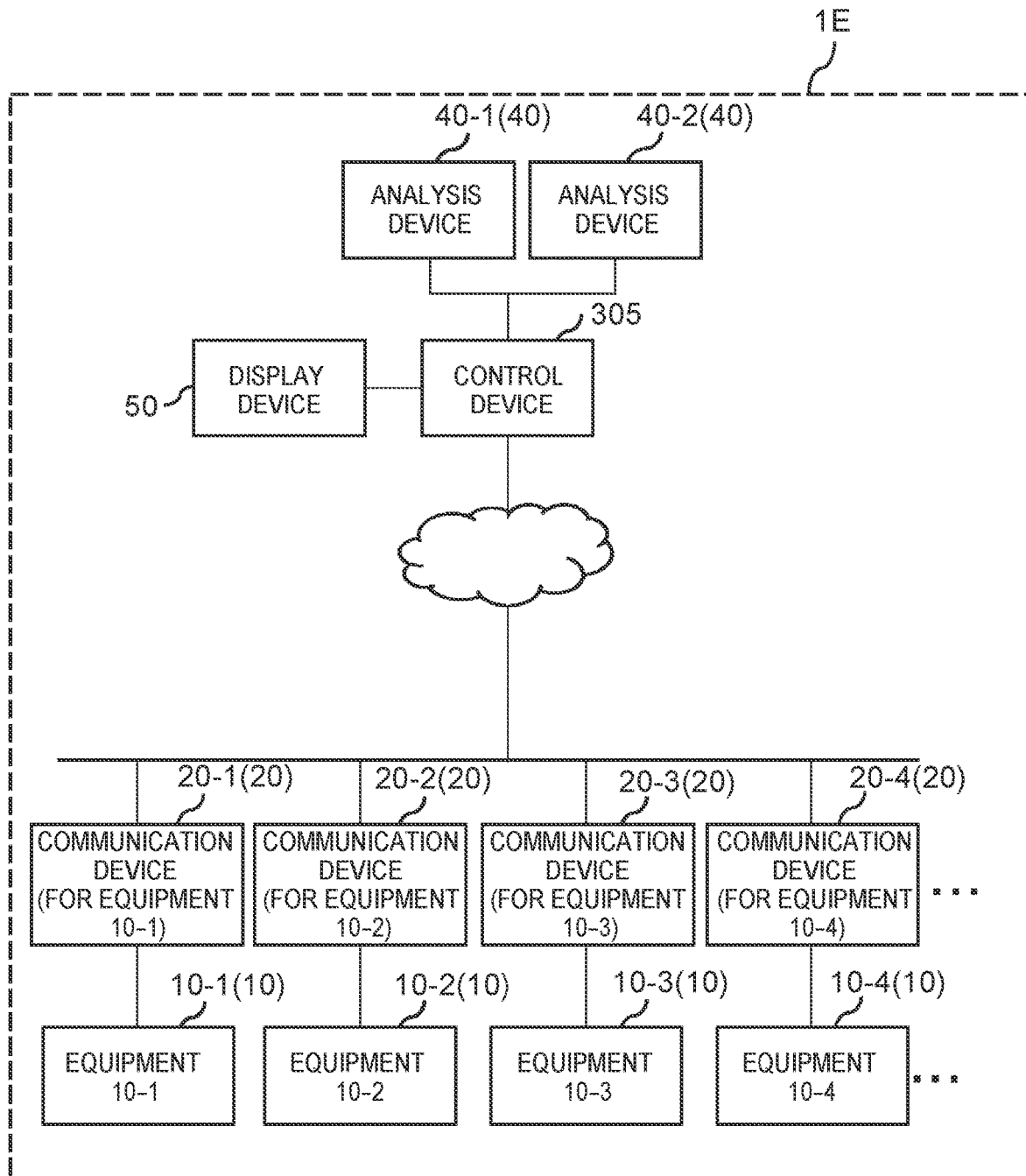
FIG. 16 is a schematic diagram of an information processing system according to a fourth embodiment.

FIG. 16 is a schematic diagram showing an information processing system 1E according to the fourth embodiment. In the fourth embodiment, the same reference numerals as those of the first embodiment will be assigned to the same components, and detailed description will be omitted.

As shown in FIG. 16, the information processing system 1E according to the fourth embodiment includes a plurality of communication devices 20 (communication devices 20-1, 20-2, 20-3, and 20-4), a control devices 305, a plurality of analysis devices 40 (analysis devices 40-1 and 40-2) and a display device 50.

In the fourth embodiment, two analysis devices 40 (analysis device 40-1, analysis device 40-2) are connected to the control device 305.

Note that, while the number of the analysis devices 40 is two in FIG. 16, it is only necessary that there are two or more analysis devices 40. Communication from the communication device 20-1 (transmission source) to the communication device 20-2 (transmission destination) will be considered below.

Figure 17:
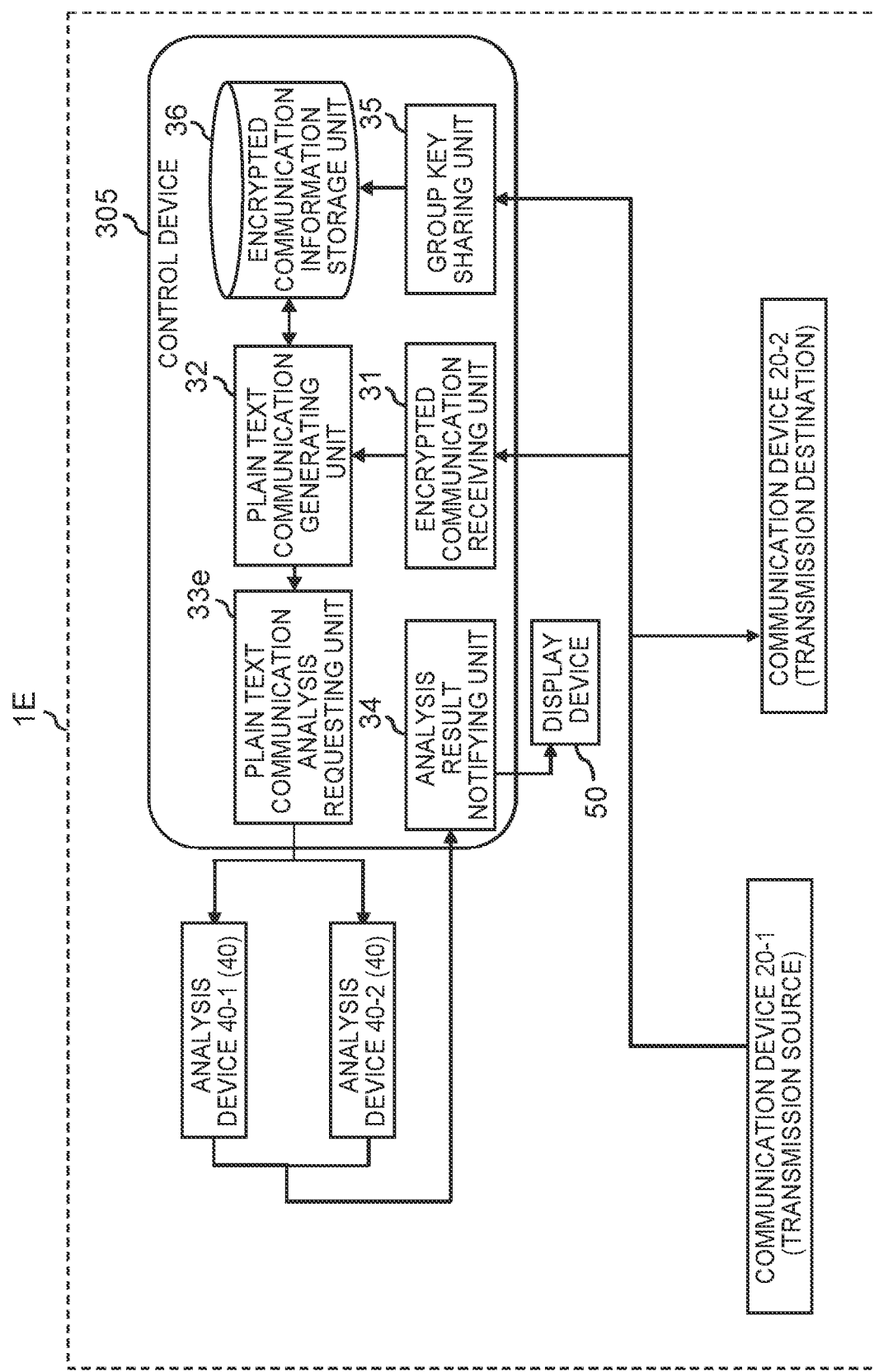
FIG. 17 is a functional block diagram of a control device according to the fourth embodiment.

FIG. 17 is a functional block diagram of a control device 305 according to the fourth embodiment. As shown in FIG. 17, the control device 305 is different from the control device 30 in the first embodiment in that a plain text communication analysis requesting unit 33e is provided in place of the plain text communication analysis requesting unit 33.

In a case where there is a plurality of analysis devices 40 which performs the same analysis processing, the plain text communication analysis requesting unit 33e manages the plurality of analysis devices 40 to which the communication packet is transmitted. As an example, the plain text communication analysis requesting unit 33e may allocate different numbers to the analysis device 40-1 and the analysis device 40-2, and may transmit the communication packet in ascending order of the numbers (in a round-robin manner) in order of arrival of the communication packets.

Further, as another example, the plain text communication analysis requesting unit 33e may allocate different numbers to the analysis device 40-1 and the analysis device 40-2, and may determine the analysis device 40 to which the communication packet is transmitted on the basis of a residue value of a hash value of the communication packet at the number of the analysis devices 40 (in FIG. 16, two).

In the information processing system 1E according to the fourth embodiment, the plurality of analysis devices 40 are caused to execute analysis processing in a dispersed manner in the same manner as the information processing system 1C according to the third embodiment. Therefore, the control device 305 can efficiently acquire an analysis result of the communication packet (judgment result as to whether or not unauthorized communication occurs).

Further, while a plurality of control devices 30 is required in the third embodiment, in the fourth embodiment, it is possible to disperse analysis processing of the analysis devices 40 if at least one control device 305 is provided.

(Explanation of Hardware Configuration)

Figure 18:
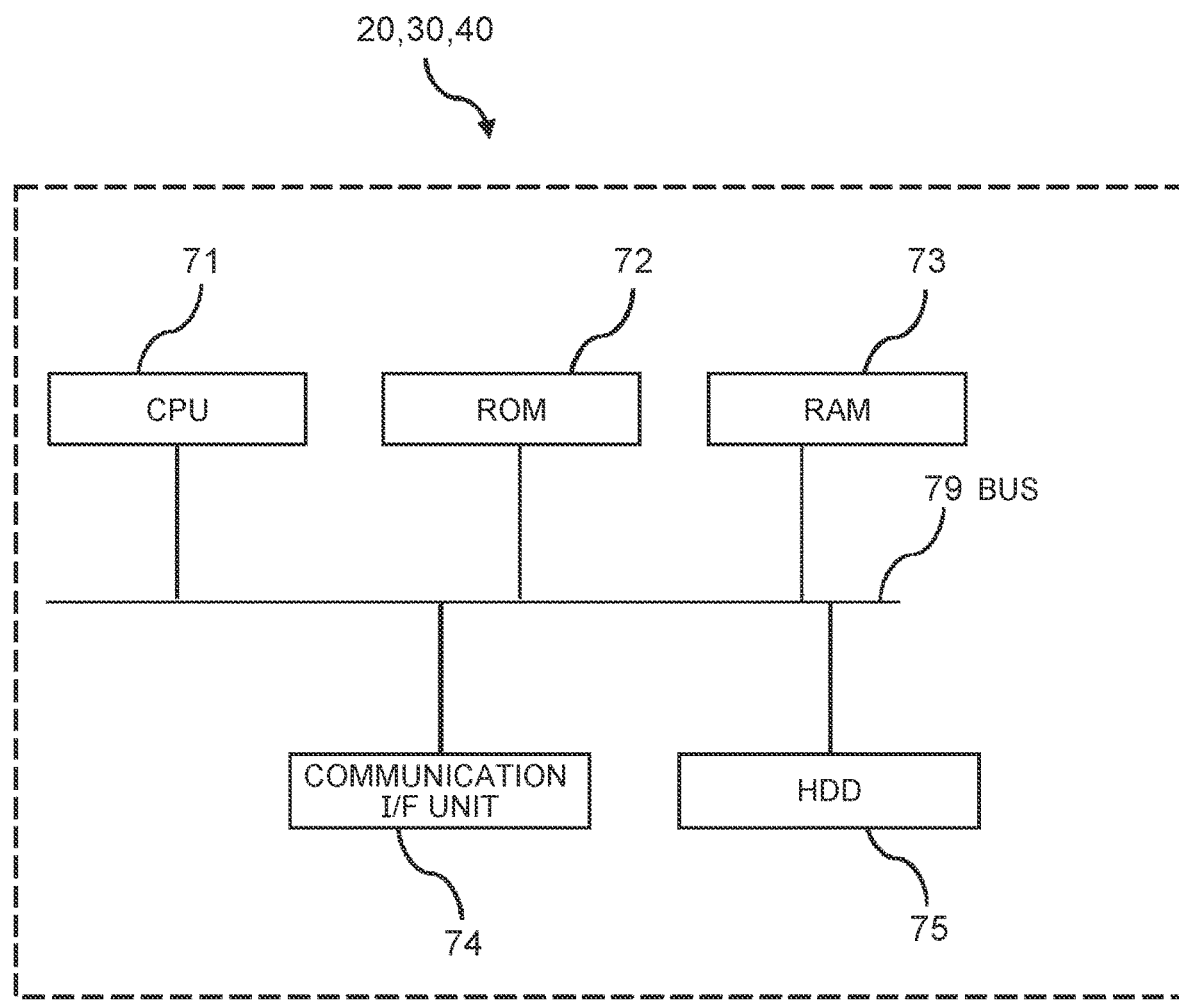
FIG. 18 is a hardware configuration diagram of the communication device, the control device and the analysis device according to the first embodiment.

FIG. 18 is a view showing an example of a hardware configuration diagram of the communication device 20, the control device 30 and the analysis device 40 according to the first embodiment. Note that, because configurations of the communication devices, the control devices and the analysis devices are similar in the second to the fourth embodiments, detailed description will be omitted.

As shown in FIG. 18, each of the communication device 20, the control device 30 and the analysis device 40 has a hardware configuration utilizing a normal computer, including a storage device such as a central processing unit (CPU) 71, a read only memory (ROM) 72, a random access memory (RAM) 73 and a hard disk drive (HDD) 75, a communication I/F unit 74 which performs communication with various kinds of equipment, and a bus 79 which connects the respective components.

The above-described each function of the communication device 20, the control device 30 and the analysis device 40 in the above-described embodiments and modifications is realized on a computer by the CPU 71 reading out a program from the ROM 72 onto the RAM 73 and executing the program.

Note that programs for executing the above-described respective kinds of processing may be stored in the HDD 75. Further, the programs for executing the above-described respective kinds of processing may be incorporated into the ROM 72 in advance. Further, the programs for executing the above-described respective kinds of processing may be provided as a computer program product stored in a computer readable storage medium such as a compact disk read only memory (CD-ROM), a compact disk recordable (CD-R), a memory card, a digital versatile disk (DVD) and a flexible disk, as a file having an installable form or an executable form.

Further, the programs for executing the above-described respective kinds of processing may be stored on a computer connected to a network such as the Internet, and provided by being downloaded via the network. Further, the programs for executing the above-described respective kinds of processing may be provided or distributed via a network such as the Internet.

Note that, the control device 301 according to the second embodiment may include an input unit such as a keyboard and a mouse for accepting input of an analysis rule from the operator, and a display unit such as a display for displaying an input screen, in addition to the above-described hardware configuration.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that transmits a communication packet to a transmission destination communication device, the communication device and the transmission destination communication device being differently one of a plurality of communication devices connectable to a control device, the communication device comprising:

a memory that stores first information for judging a normality of the communication packet; and processing circuitry configured to operate as:

an analyzing unit configured to judge the normality of a received communication packet based on the received communication packet and the first information;

a transmission destination determining unit configured to determine the transmission destination communication device and the control device as transmission destinations of the received communication packet, when the analyzing unit judges that the received communication packet is not normal;

a generating unit configured to encrypt the communication packet to be transmitted to the transmission destinations determined by the transmission destination determining unit; and a transmitting unit configured to transmit the communication packet encrypted by the generating unit, to the transmission destination communication device and the control device respectively.

2. The communication device according to claim 1, wherein the transmission destination determining unit determines the transmission destination communication device as a transmission destination of the communication packet, when the analyzing unit judges that the communication packet is normal.

3. The communication device according to claim 1, wherein the first information is packet information of communication packets of which communication is allowed.

4. The communication device according to claim 3, wherein the analyzing unit judges that the communication packet is not normal when a packet information of the communication packet does not match the packet information of the first information.

5. The communication device according to claim 4, wherein the analyzing unit judges that the communication packet is normal when the packet information of the communication packet matches the packet information of the first information.

6. The communication device according to claim 1, wherein the memory further stores a group key to be shared by the control device and the transmission destination communication device, and the generating unit performs encryption using the group key.

7. The communication device according to claim 1, further comprising:

a plurality of control devices; and a plurality of analysis devices respectively connected to each of the plurality of control devices, wherein the transmission destination determining unit determines any of the plurality of control devices as the transmission destination.

8. The communication device according to claim 7, wherein the transmission destination determining unit, when a type of a communication protocol used by the communication packet is a control system protocol, determines a control device connected to an analysis device which is appropriate for analysis of the control system protocol as the transmission destination, and when the type of the communication protocol is an information system protocol, determines a control device connected to an analysis device which is appropriate for analysis of the information system protocol as the transmission destination.

9. The communication device according to claim 1, wherein the communication device becomes a transmission destination communication device, when the communication device receives a communication packet from another communication device included in the plurality of communication devices.

10. A communication device that transmits a communication packet to a transmission destination communication device, the communication device and the transmission destination communication device being differently one of a plurality of communication devices connectable to a control device, the communication device comprising:

a memory that stores first information for judging a normality of the communication packet and second information for judging whether or not the communication packet is suspected to be unauthorized; and processing circuitry configured to operate as:

an analyzing unit configured to judge the normality of a received communication packet based on the received communication packet and the first information, and judge whether or not the received communication packet is suspected to be unauthorized based on the received communication packet and the second information, when it is judged that the received communication packet is normal;

a transmission destination determining unit configured to determine the transmission destination communication device and the control device as transmission destinations of the received communication packet, when the analyzing unit judges that the received communication packet is suspected to be unauthorized;

a generating unit configured to encrypt the communication packet to be transmitted to the transmission destinations; and a transmitting unit configured to transmit the communication packet encrypted by the generating unit, to the transmission destination communication device and the control device respectively.

11. The communication device according to claim 10, wherein the transmission destination determining unit determines the transmission destination communication device as a transmission destination of the communication packet, when the analyzing unit judges that the communication packet is not suspected to be unauthorized.

12. The communication device according to claim 10, wherein the second information is information included in communication packets which have been previously judged as unauthorized communication.

13. An information processing system comprising:

a control device; and a communication device that transmits a communication packet to a transmission destination communication device, the communication device and the transmission destination communication device being differently one of a plurality of communication devices connectable to the control device, wherein the communication device comprises a memory that stores first information for judging a normality of the communication packet, processing circuitry configured to operate as an analyzing unit configured to judge the normality of a received communication packet based on the received communication packet and the first information, a transmission destination determining unit configured to determine the transmission destination communication device and the control device as transmission destinations of the received communication packet, when the analyzing unit judges that the received communication packet is not normal, a generating unit configured to encrypt the communication packet to be transmitted to the transmission destinations determined by the transmission destination determining unit, and a transmitting unit configured to transmit the communication packet encrypted by the generating unit, to the transmission destination communication device and the control device respectively, wherein the control device comprises an encrypted communication receiving unit configured to receive the communication packet transmitted by the transmitting unit, and a plain text communication generating unit configured to decrypt the communication packet received by the encrypted communication receiving unit.

14. The information processing system according to claim 13, further comprising:

an analysis device connected to the control device, wherein the control device further comprises a plain text communication analysis requesting unit configured to transmit the communication packet decrypted by the plain text communication generating unit, to the analysis device.

15. The information processing system according to claim 14, wherein the analysis device comprises a plain text communication receiving unit configured to receive the communication packet transmitted by the plain text communication analysis requesting unit, a plain text communication analyzing unit configured to analyze the communication packet received by the plain text communication receiving unit, and an analysis result transmitting unit configured to transmit an analysis result of the communication packet analyzed by the plain text communication analyzing unit, to the control device.

16. The information processing system according to claim 15, wherein the control device further comprises an analysis result notifying unit configured to receive the analysis result transmitted by the analysis result transmitting unit, and notify the analysis result via a display device.

17. A non-transitory computer readable storage medium for causing a computer to perform operations of a communication device that transmits a communication packet to a transmission destination communication device, the communication device and the transmission destination communication device being differently one of a plurality of communication devices connectable to a control device, the operations comprising:

storing first information for judging a normality of the communication packet;

judging the normality of a received communication packet based on the received communication packet and the first information;

determining the transmission destination communication device and the control device as transmission destinations of the received communication packet, when is judged that the received communication packet is not normal;

encrypting the communication packet to be transmitted to the transmission destinations; and transmitting the communication packet encrypted, to the transmission destination communication device and the control device respectively.

* * * * *